US010231258B2

(12) United States Patent
Liu et al.

(10) Patent No.: US 10,231,258 B2
(45) Date of Patent: Mar. 12, 2019

(54) NEIGHBOR AWARENESS NETWORKING—SCHEDULE UPDATE

(71) Applicant: Apple Inc., Cupertino, CA (US)

(72) Inventors: Yong Liu, Campbell, CA (US); Lawrie Kurian, San Jose, CA (US); Peter N. Heerboth, San Jose, CA (US); Christiaan A. Hartman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 7 days.

(21) Appl. No.: 15/684,750

(22) Filed: Aug. 23, 2017

(65) Prior Publication Data

US 2018/0063863 A1 Mar. 1, 2018

Related U.S. Application Data

(60) Provisional application No. 62/381,132, filed on Aug. 30, 2016.

(51) Int. Cl.
| | |
|---|---|
| *H04W 72/12* | (2009.01) |
| *H04W 84/12* | (2009.01) |
| *H04W 88/02* | (2009.01) |
| *H04W 72/04* | (2009.01) |
| *H04W 76/14* | (2018.01) |

(52) U.S. Cl.
CPC ... *H04W 72/1278* (2013.01); *H04W 72/1205* (2013.01); *H04W 72/1263* (2013.01); *H04W 72/0446* (2013.01); *H04W 72/0453* (2013.01); *H04W 76/14* (2018.02); *H04W 84/12* (2013.01); *H04W 88/02* (2013.01)

(58) Field of Classification Search
CPC ......... H04W 72/1278; H04W 72/1205; H04W 72/1263; H04W 72/0453; H04W 72/0446; H04W 76/14; H04W 84/12; H04W 88/02
See application file for complete search history.

(56) References Cited

U.S. PATENT DOCUMENTS

| | | | |
|---|---|---|---|
| 8,848,613 B2 | 9/2014 | Chen et al. | |
| 8,942,219 B2 | 1/2015 | Pratt, Jr. et al. | |
| 2016/0309496 A1 | 10/2016 | Huang et al. | |
| 2016/0315859 A1* | 10/2016 | Buesker | H04L 45/741 |
| 2017/0026901 A1 | 1/2017 | Patil et al. | |
| 2018/0041947 A1* | 2/2018 | Pang | H04W 48/08 |
| 2018/0077738 A1* | 3/2018 | Kim | H04W 80/10 |

* cited by examiner

Primary Examiner — Wayne H Cai
(74) Attorney, Agent, or Firm — Meyertons Hood Kivlin Kowert & Goetzel, P.C.; Jeffrey C. Hood; Brian E. Moore

(57) ABSTRACT

In some embodiments, one or more wireless stations operate to configure direct communication with neighboring mobile stations, e.g., direct communication between the wireless stations without utilizing an intermediate access point. Embodiments of the disclosure relate to NAN datapath scheduling and NAN pre-datapath operation setup and scheduling. The NAN datapath embodiments described herein provide a mechanism through which devices can communicate and provide services. In particular, embodiments described herein relate to techniques for devices (e.g., NAN devices) to propose and confirm schedule updates. The datapath model, and in particular the techniques described herein, may be implemented for unicast and multicast communication between wireless stations.

20 Claims, 21 Drawing Sheets

NEIGHBOR AWARENESS NETWORKING—SCHEDULE UPDATE

PRIORITY DATA

This application claims benefit of priority to U.S. Provisional Application Ser. No. 62/381,132, titled "NAN Schedule Update", filed Aug. 30, 2016, by Yong Liu, Lawrie Kurian, Peter N. Heerboth, and Christiaan A. Hartman, which is hereby incorporated by reference in its entirety as though fully and completely set forth herein.

FIELD

The present application relates to wireless communications, including techniques for wireless communication among wireless stations in a wireless networking system.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "user devices" or STA or UE for short. Wireless stations can be either wireless access points or wireless clients (or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

In some prior art systems, Wi-Fi mobile stations are able to communicate directly with each other without using an intermediate access point. However, improvements in the operation of such devices are desired, such as in setup and coordination of the communication between such devices.

SUMMARY

Some embodiments described herein relate to systems and methods for peer wireless stations (e.g., wireless stations configured to communicate with neighboring wireless stations without utilizing an intermediate access point) to perform accelerated service discovery, including aggressive probing and scanning for available services.

Some embodiments relate to a wireless station that includes one or more antennas, one or more radios, and one or more processors coupled (directly or indirectly) to the radios. At least one radio is configured to perform Wi-Fi communications, e.g., via a Wi-Fi interface. The wireless station may perform voice and/or data communications, as well as any or all of the methods described herein.

In some embodiments, one or more wireless stations operate to configure direct communication with neighboring mobile stations, e.g., direct communication between the wireless stations without utilizing an intermediate access point. to techniques for devices (e.g., NAN devices) to propose and confirm schedule updates. The datapath model, and in particular the techniques described herein, may be implemented for unicast and multicast communication between wireless stations.

In some embodiments, a wireless station may be configured to maintain a first data link schedule with a neighboring wireless station at a first and second level of the wireless station (e.g., a host or application layer and a firmware layer). In some embodiments, maintaining the data link schedule may include maintaining a first data structure on the first level and maintaining a second data structure on the second level. Further, in response to an indication to update the first data link schedule to a second data link schedule, the wireless station may be configured to update a second sequence number associated with a second data link schedule in the first data structure while maintaining a first sequence number associated with the first data link schedule in the second data structure and transmit, via a peer-to-peer communication protocol (e.g., NAN), a request to update the first data link schedule to the second data link schedule to the neighboring wireless station. Further, in response to receiving a confirmation of the second schedule from the neighboring wireless station, the wireless station may be configured to update the first sequence number to correspond to the second sequence number.

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
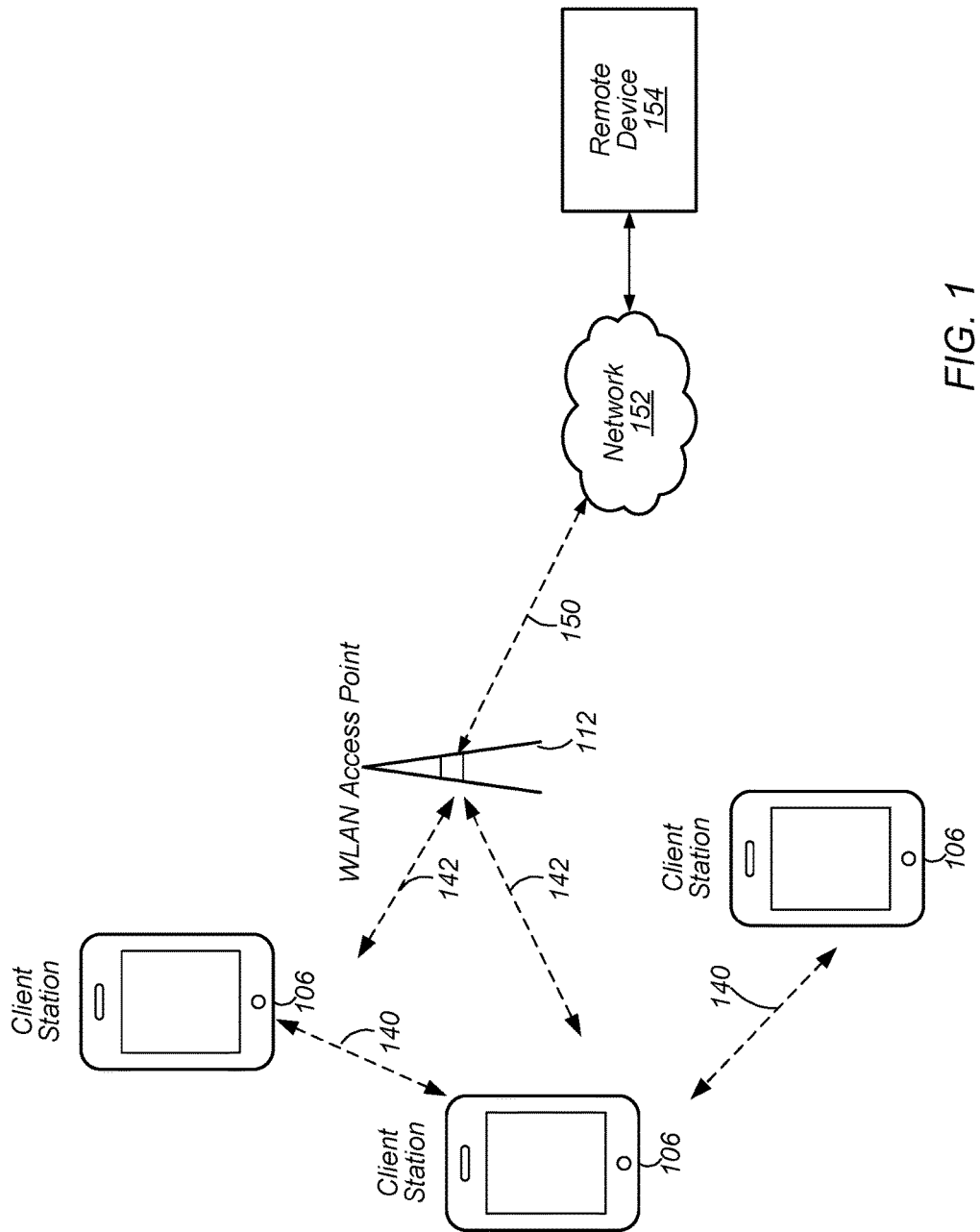
FIG. 1 illustrates an example WLAN communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment
AP: Access Point
DL: Downlink (from BS to UE)
UL: Uplink (from UE to BS)
TX: Transmission/Transmit
RX: Reception/Receive
LAN: Local Area Network
WLAN: Wireless LAN
RAT: Radio Access Technology
DW: Discovery Window
NW: Negotiation Window
FAW: Further Availability Window
SID: Service ID
SInf: Service Information
Sinf-Seg: Service Information Segment
NW-Req: to request the peer NAN device to present in NW
CaOp: Capabilities and Operations elements
Security: Security preferences
SessionInfo: advertisement_id, session_mac, session_id, port, proto
ChList: preferred datapath channels
AM: anchor master
DW: discovery window
HCFR: hop count from remote devices
NAN: neighbor awareness network
SDA: service descriptor attribute
SDF: service discovery frame
SRF: service response filter
TSF: time synchronization function Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™, etc. Various other types of devices would fall into this category if they include Wi-Fi or both cellular and Wi-Fi communication capabilities, such as laptop computers (e.g., MacBook™), portable gaming devices (e.g., Nintendo DS™, PlayStation Portable™, Gameboy Advance™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example, a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

NAN data link (NDL)—refers to a communication link between peer wireless stations (e.g., peer NAN devices). Note that the peer devices may be in a common (e.g., same) NAN cluster. In addition, a NAN data link may support one or more NAN datapaths between peer wireless stations. Note further that a NAN data link may only belong to a single NAN data cluster.

NAN datapath (NDP)—refers to a communication link between peer wireless stations that supports a service. Note that one or more NAN datapaths may be supported by a NAN data link. Additionally, note that a NAN datapath supports a service between wireless stations. Typically, one of the peer wireless stations will be a publisher of the service and the other peer wireless station will be a subscriber to the service.

NAN cluster—refers to multiple peer wireless stations linked via synchronization to a common time source (e.g., a common NAN clock). Note that a peer wireless station may be a member of more than one NAN cluster.

NAN data cluster (NDC)—refers to a set of peer wireless stations in a common (e.g., same) NAN cluster that share a common base schedule (e.g., a NAN data cluster base schedule). In addition, peer wireless stations in a NAN data cluster may share at least one NAN data link that includes an active datapath with another member wireless station within the NAN data cluster.

Note that a peer wireless station may be a member of more than one NAN cluster; however, as noted previously, a NAN data link belongs to exactly one NAN data cluster. Note further, that in a NAN data cluster, all member peer wireless stations may maintain tight synchronization (e.g., via a NAN data cluster base schedule) amongst each other and may be present at a common (e.g., same) further availability slot(s) (or window(s)) as indicated by a NAN data cluster base schedule. In addition, each NAN data link may have its own NAN data link schedule and the NAN data link schedule may be a superset of a NAN data cluster base schedule.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

The headings used herein are for organizational purposes only and are not meant to be used to limit the scope of the description. As used throughout this application, the word "may" is used in a permissive sense (e.g., meaning having the potential to), rather than the mandatory sense (e.g., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third component electrically connected to the module substrate" does not preclude scenarios in which a "fourth component electrically connected to the module substrate" is connected prior to the third component, unless otherwise specified. Similarly, a "second" feature does not require that a "first" feature be implemented prior to the "second" feature, unless otherwise specified.

FIG. 1—WLAN System

FIG. 1 illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices (e.g., via direct communication channels 140), without use of the access point 112.

In some embodiments, as further described below, a wireless device 106 may be configured to perform methods for proposing and updating data link schedules. In some embodiments, the wireless device 106 may be configured to maintain a first data link schedule with a neighboring wireless station at a first and second level of the wireless device 106 (e.g., a host or application layer and a firmware layer). In some embodiments, maintaining the data link schedule may include maintaining a first data structure on the first level and maintain a second data structure on the second level. Further, in response to an indication to update the first data link schedule to a second data link schedule. the wireless device 106 may be configured to update a second sequence number associated with a second data link schedule in the first data structure while maintaining a first sequence number associated with the first data link schedule in the second data structure and transmit, via a peer-to-peer communication protocol (e.g., NAN), a request to update the first data link schedule to the second data link schedule to the neighboring wireless station. Further, in response to receiving a confirmation of the second schedule from the neighboring wireless station, the wireless device 106 may be configured to update the first sequence number to correspond to the second sequence number.

Figure 2:
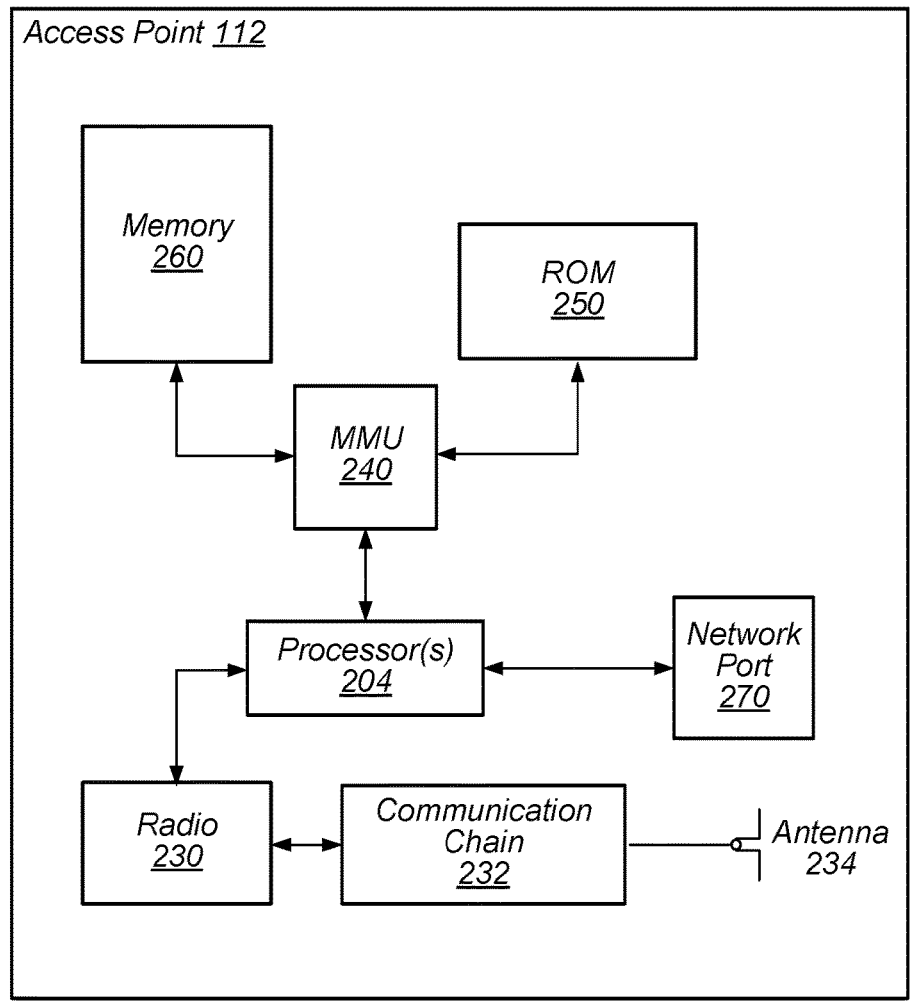
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, AP 112 may be configured to perform methods for proposing and updating data link schedules. In some embodiments, the AP 112 may be configured to maintain a first data link schedule with a neighboring wireless station at a first and second level of the AP 112 (e.g., a host or application layer and a firmware layer). In some embodiments, maintaining the data link schedule may include maintaining a first data structure on the first level and maintain a second data structure on the second level. Further, in response to an indication to update the first data link schedule to a second data link schedule. the AP 112 may be configured to update a second sequence number associated with a second data link schedule in the first data structure while maintaining a first sequence number associated with the first data link schedule in the second data structure and transmit, via a peer-to-peer communication protocol (e.g., NAN), a request to update the first data link schedule to the second data link schedule to the neighboring wireless station. Further, in response to receiving a confirmation of the second schedule from the neighboring wireless station, the AP 112 may be configured to update the first sequence number to correspond to the second sequence number.

Figure 3:
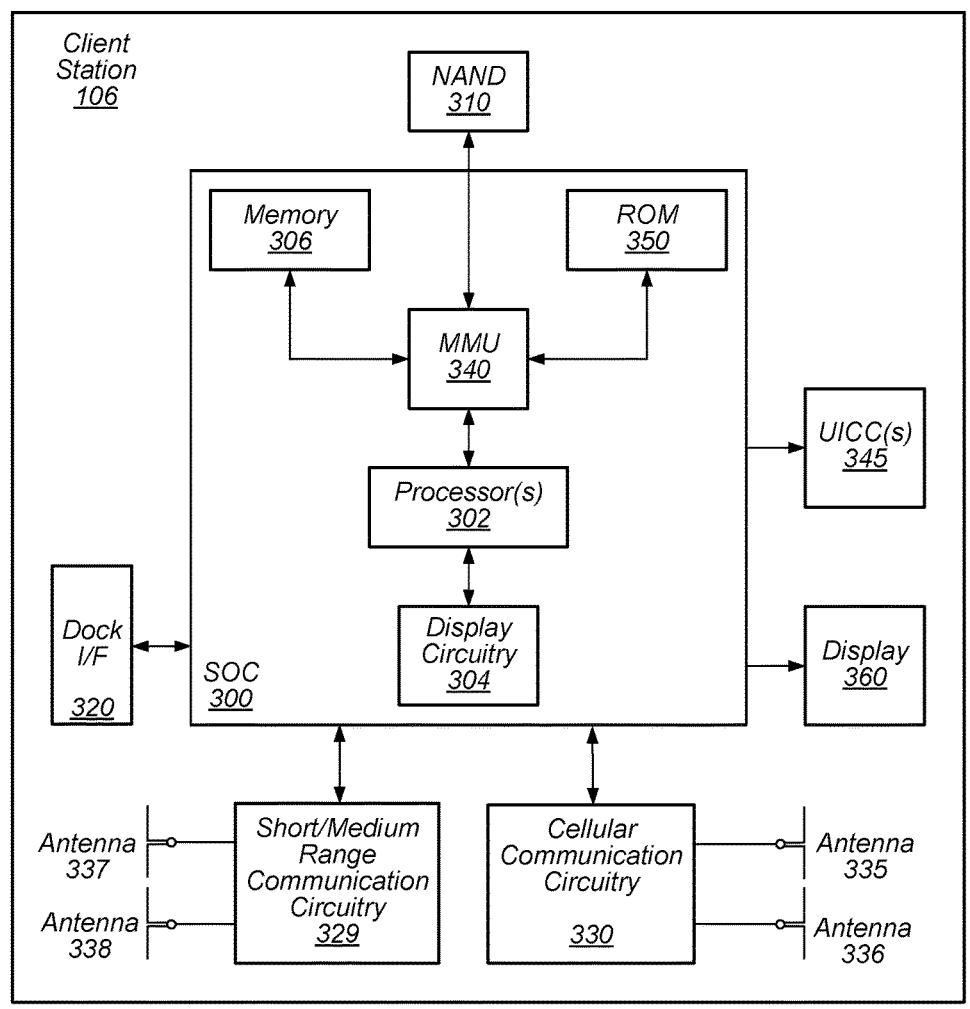
FIG. 3 illustrates an example simplified block diagram of a mobile station (UE), according to some embodiments.

FIG. 3—Client Station Block Diagram

FIG. 3 illustrates an example simplified block diagram of a client station 106. It is noted that the block diagram of the client station of FIG. 3 is only one example of a possible client station. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the client station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1. Further, in some embodiments, as further described below, client station 106 may be configured to perform methods for proposing and updating data link schedules. In some embodiments, the client station 106 may be configured to maintain a first data link schedule with a neighboring wireless station at a first and second level of the client station 106 (e.g., a host or application layer and a firmware layer). In some embodiments, maintaining the data link schedule may include maintaining a first data structure on the first level and maintain a second data structure on the second level. Further, in response to an indication to update the first data link schedule to a second data link schedule. the client station 106 may be configured to update a second sequence number associated with a second data link schedule in the first data structure while maintaining a first sequence number associated with the first data link schedule in the second data structure and transmit, via a peer-to-peer communication protocol (e.g., NAN), a request to update the first data link schedule to the second data link schedule to the neighboring wireless station. Further, in response to receiving a confirmation of the second schedule from the neighboring wireless station, the client station 106 may be configured to update the first sequence number to correspond to the second sequence number.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements (and/or processing circuitry). Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short range wireless communication circuitry 329 may each include one or more processing elements (and/or processing circuitry). In other words, one or more processing elements may be included in cellular communication circuitry 330 and also in short range wireless communication circuitry 329. Thus, each of cellular communication circuitry 330 and short range wireless communication circuitry 329 may include one or more integrated circuits (ICs) that are configured to perform the functions of cellular communication circuitry 330 and short range wireless communication circuitry 329, respectively. In addition, each integrated circuit may include circuitry (e.g., first circuitry, second circuitry, etc.) configured to perform the functions of cellular communication circuitry 330 and short range wireless communication circuitry 329.

Wi-Fi Peer to Peer Communication Protocol

In some embodiments, Wi-Fi devices (e.g., client station 106) may be able to communicate with each other in a peer to peer manner, e.g., without the communications going through an intervening access point. There are currently two types of Wi-Fi peer to peer networking protocols in the Wi-Fi Alliance. In one type of peer to peer protocol, when two Wi-Fi devices (e.g., wireless stations) communicate with each other, one of the Wi-Fi devices essentially acts as a pseudo access point and the other acts as a client device. In a second type of Wi-Fi peer to peer protocol, referred to as a neighbor awareness networking (NAN), the two Wi-Fi client devices (wireless stations) act as similar peer devices in communicating with each other, e.g., neither one behaves as an access point.

In a NAN system, each wireless station may implement methods to ensure that it is synchronized with a neighboring wireless station to which it is communicating. Further, a wireless station may negotiate a common discovery window for exchange of synchronization packets to help ensure the devices that are communicating directly with each other are properly synchronized to enable the communication. Once two wireless stations have the same discovery window they may exchange synchronization packets to stay synchronized with each other. The wireless stations may also use the discovery window to exchange service discovery frames to convey other information such as further availability beyond discovery windows.

The NAN protocol includes two aspects: 1) synchronization and discovery (NAN 1.0) and 2) datapath transmission (NAN 2.0). NAN 1.0 describes methods for NAN protocol synchronization and discovery. After two wireless stations have discovered each other (per NAN 1.0) they may implement a procedure to setup a NAN datapath between them so that they can properly communicate. After this, the two wireless stations arrange for a common datapath negotiation window so that they can negotiate capabilities, synchronization requirements, and exchange further service information. The datapath negotiation window is a time window that enables two wireless stations to communicate with each other so that they can negotiate these capabilities and synchronization requirements and exchange this further service information. Once the datapath negotiation window has been established and NAN datapath setup has been performed, the wireless stations may perform datapath synchronization to help ensure that the two stations stay synchronized with each other for proper communication. Finally, datapath resource allocation relates to two peer wireless stations communicating with each other regarding a common time slot and channel for communication. In other words, the two devices communicate with each other regarding which channel they should use and at which time slot, to help ensure proper communication between them. Additionally, the two devices communicate with each other regarding which channel and time slot each would prefer to use for future communications between the devices.

Embodiments described herein further define methods for updating datapath and data link schedules.

NAN Schedule Update

Figure 4:
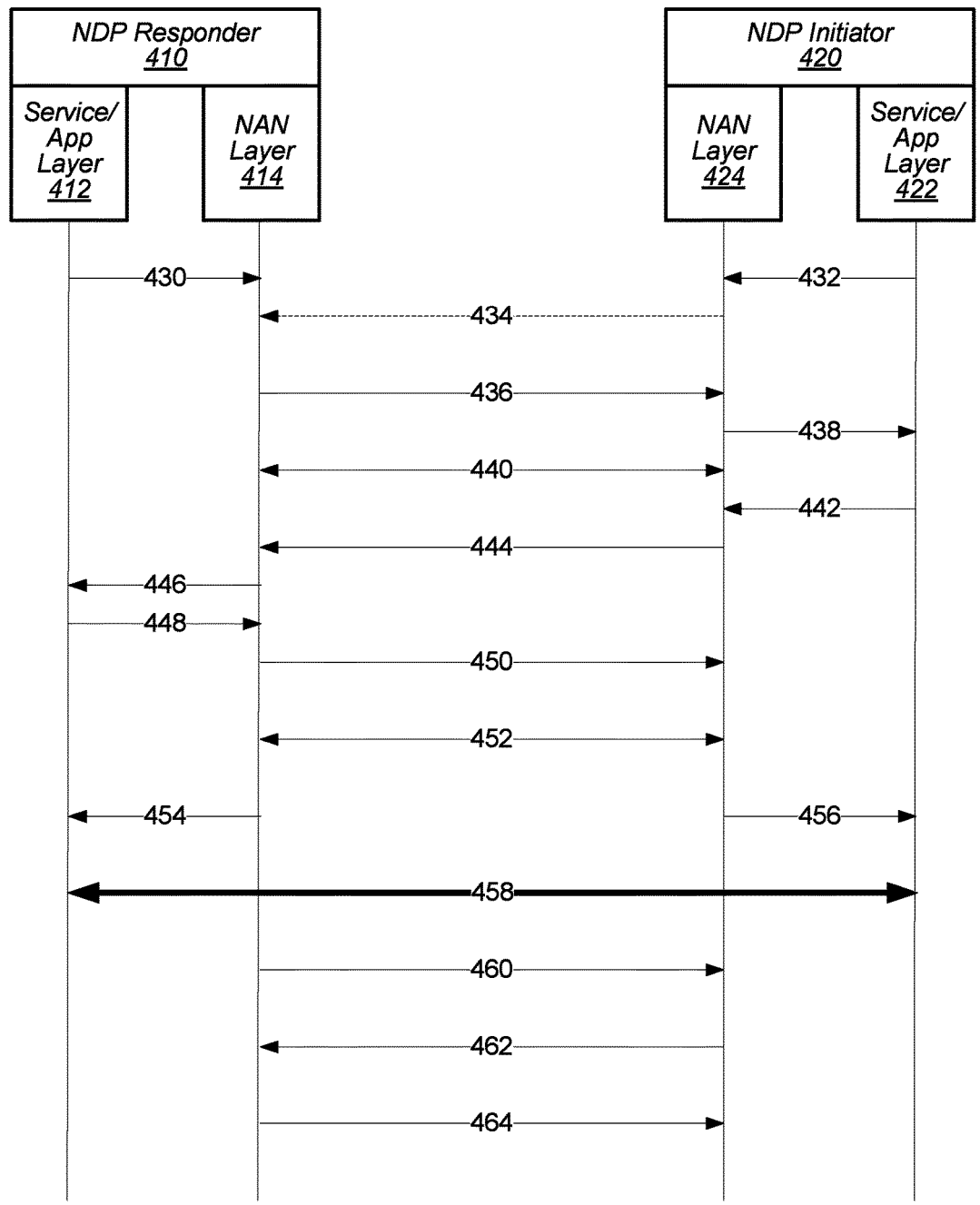
FIG. 4 illustrates establishment of a data link together with a datapath via a datapath setup handshake.

FIG. 4 illustrates establishment of a data link together with a datapath via a datapath setup handshake, according to some implementations. As shown, two devices (e.g., peer devices in communication according to a peer-to-peer protocol such as NAN) may establish a datapath without an existing data link between the devices and then establish a data link (e.g., a NAN data link or NDL). Once the data link has been established, either device may update the data link schedule by initiating (or starting) a data link update handshake as illustrated on slide 2. Note that the data link update handshake (e.g., message exchange and negotiation) may be similar to the data link setup handshake.

For example, a NAN layer 424 of an initiating device, such as NAN datapath (NDP) initiator 420, may receive a subscribe request 432 from a service/application layer 422. Similarly, a NAN layer 414 of a responding device, such as NDP responder 410, may receive a publish request 430 from a service/application layer 412. After receiving subscribe request 432, NAN layer 424 may send a subscribe message 434 to NAN layer 414. In response, NAN layer 414 may send a publish message 436 to NAN layer 424. NAN layer 424 may forward the discovery results 438 to service/app layer 422. In addition, NAN layers 414 and 424 may exchange further messages 440 to perform further service discovery. Service/app layer 422 may send a unicast data request 442 to NAN layer 424 and NAN layer 424 may send a data path request message 444 (including a NDP type request, an NDL type request, and an initial proposal of an NDL schedule) ton NAN layer 414. NAN layer 414 may forward a data indication 446 to service/app layer 412 and may receive a data response 448 from service/app layer 412. NAN layer 414 may then send a data path response 450 (including NDP type response, an NDL type response, and a counter proposal for the NDL schedule) to NAN layer 424. NAN layer 424 may respond with a data path confirm message 452 (including confirmation of the NDL type and NDL schedule proposal) to NAN layer 414. NAN layers 414 and 424 may confirm the datapath with Service/app layers 412 and 422 via data confirm messages 454 and 456. Service/app layers 412 and 422 may then perform data communications 458 according to the confirmed NDL schedule.

After data communication has been established, to change and/or update the NDL schedule, NAN layer 414 may send a schedule request 460 (including a new NDL schedule proposal) to NAN layer 424. NAN layer 424 may respond with a schedule response 462 (including an NDL schedule counter proposal). NAN layer 414 may send a schedule confirmation 464 (including an NDL schedule confirmation) to NAN layer 424 to finalize the schedule update.

In some implementations, when a device has data links with multiple peers, it may be inefficient to use data link update negotiations (e.g., scheduling update via handshake negotiations with individual peer devices as illustrated by FIG. 4) to update data links with the multiple peers. Thus, the device may generate a new availability schedule (e.g., further availability windows or FAWs) based on its new schedule capabilities or constraints, as well as existing data link schedules with the multiple peers. The device can then transmit its new availability schedule to the multiple peers, which generate new data link channel resource blocks (CRBs) based on the device's new availability schedule and the peers' own availability schedules. The peers may also update their availability schedules to improve the new data link schedules.

Figure 5:
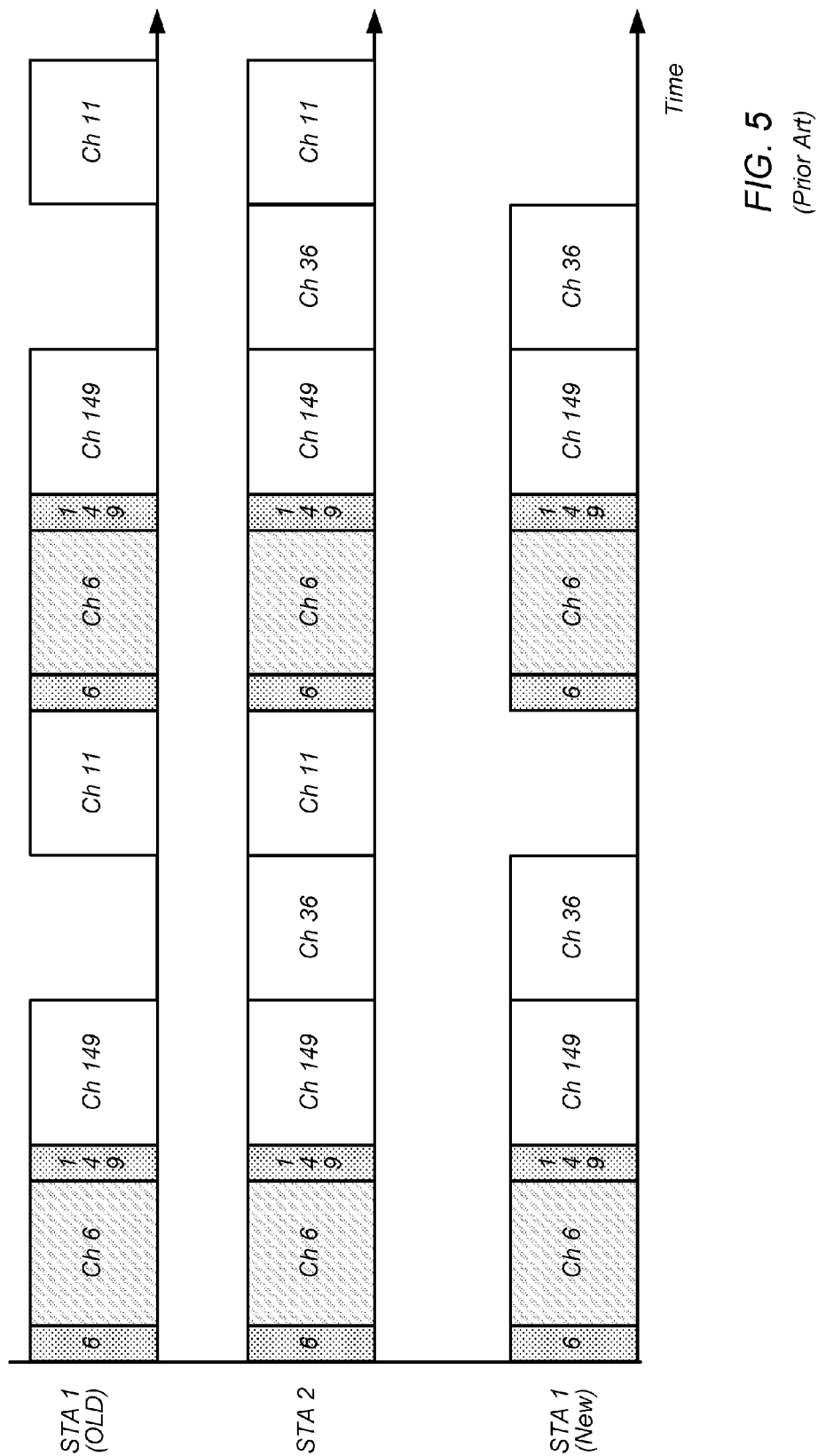
FIG. 5 illustrates adoption of a new schedule by a wireless device.

For example, as illustrated by FIG. 5, a wireless station may have an initial schedule (e.g., schedule for STA 1 (old)) which may include transmitting/receiving on various channels (e.g., channels 6, 149, and 11) at scheduled times. A neighboring wireless station (e.g., STA 2) in communication with the wireless station (e.g., has an established data link or NAN data link) may also have a schedule that allows for communications with the wireless station. The schedule for the neighboring wireless station may include transmitting/receiving on various channels (e.g., channels 6, 149, 36, and 11) at scheduled times. As shown, initially, the wireless station and neighboring wireless station can communicate on channels 6, 149, and 11. However, after the wireless station has adopted a new schedule (e.g., STA 1 (new)), the communications can occur on channels 6, 149, and 36.

Figure 6A:
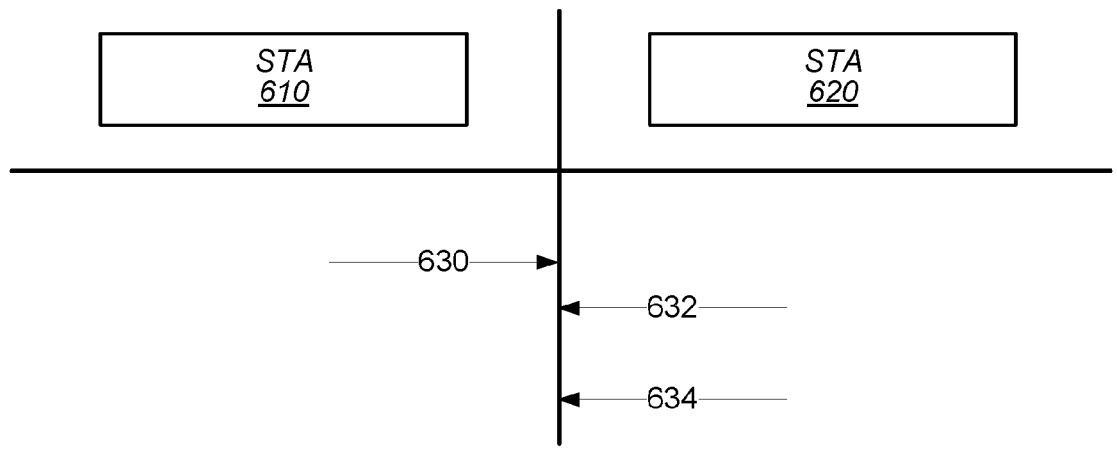
FIGS. 6A-6B illustrate an example of processing delays associated with adoption of a new schedule.
Figure 6B:
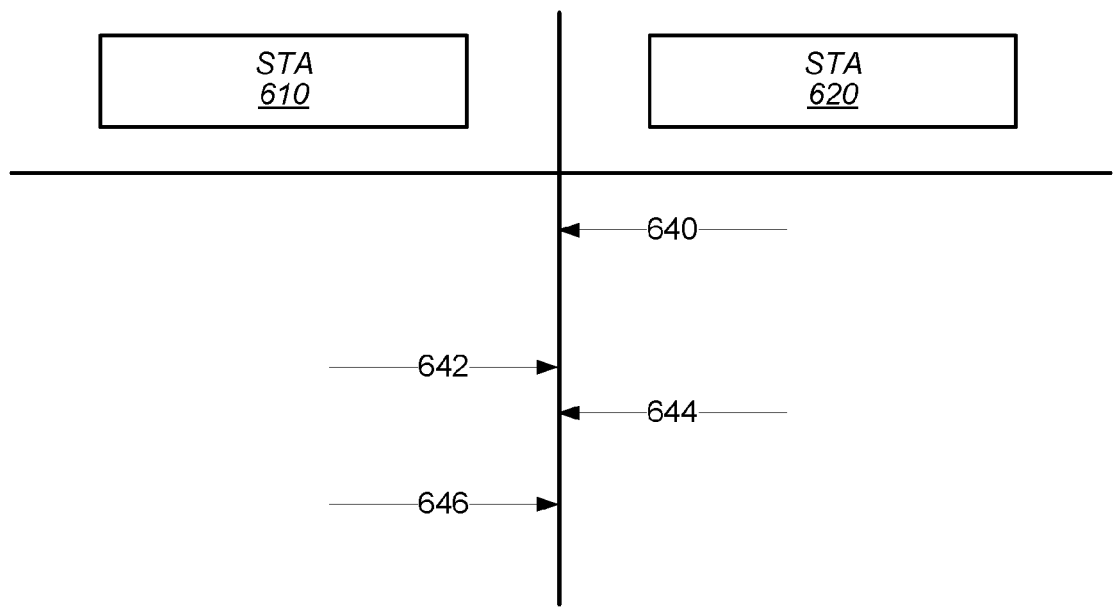

However, as further illustrated by FIGS. 6A and 6B, in existing implementations, there may be a processing delay when peers attempt to update availability schedules. For example, as illustrated by FIG. 6A, at 630 a wireless station, such as STA 610 may update and announce a new schedule and a peer device, such as STA 620, may acknowledge receipt of the new schedule at 632, however, the peer device may continue transmitting data using the prior schedule announced by the device until the peer device processes the new schedule at 634 leading to a processing delay. Similarly, as illustrated by FIG. 6B, if at 640, STA 620 proposes a conditional (e.g., a proposed) schedule update to STA 610, STA 610 may accept the proposal at 642, which confirms the conditional schedule proposal as the STA 620's new committed schedule. However, although the STA 610 is ready for the new committed schedule after it sends out the response to STA 620 at 642 (to accept STA 620's proposed conditional schedule), STA 620 may still use its old schedule until it processes the response message. Thus, STA 620 may send an acknowledgement to STA 610 at 644 but may continue to expect to receive communication 646 based on the old schedule.

Figure 7B:
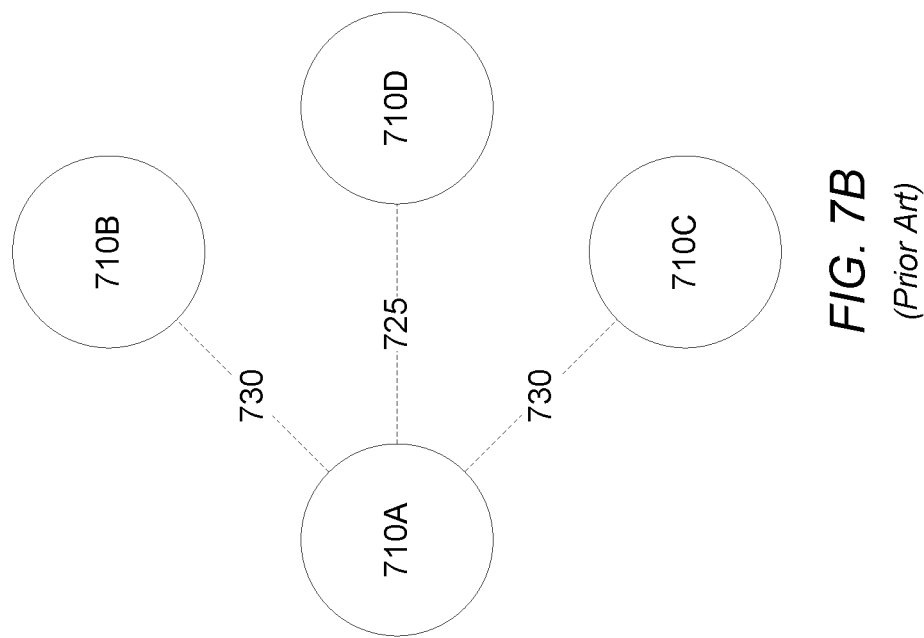
FIGS. 7A-7C illustrate another example of processing delays associated with adoption of a new schedule.
Figure 7A:
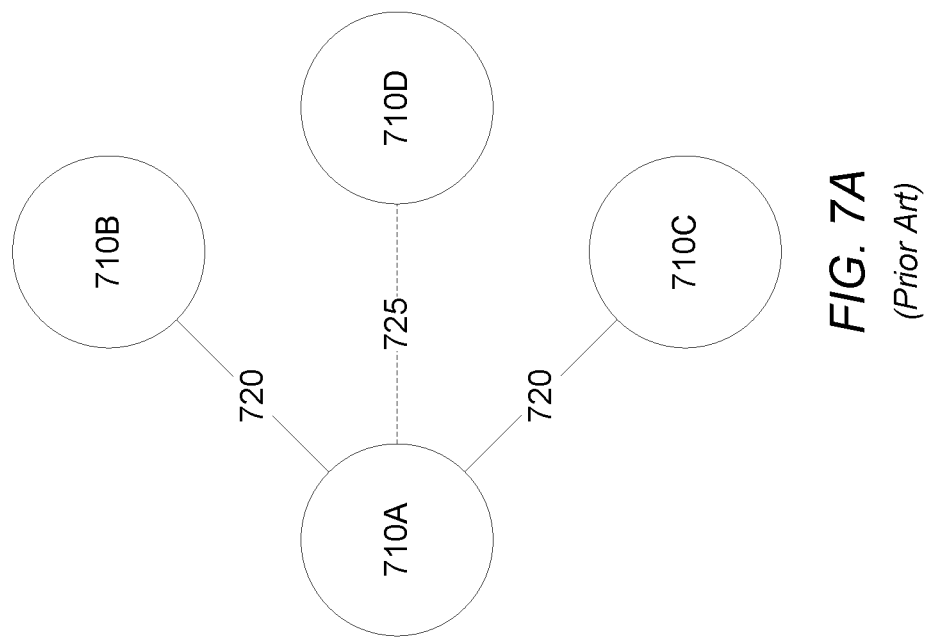
Figure 7C:
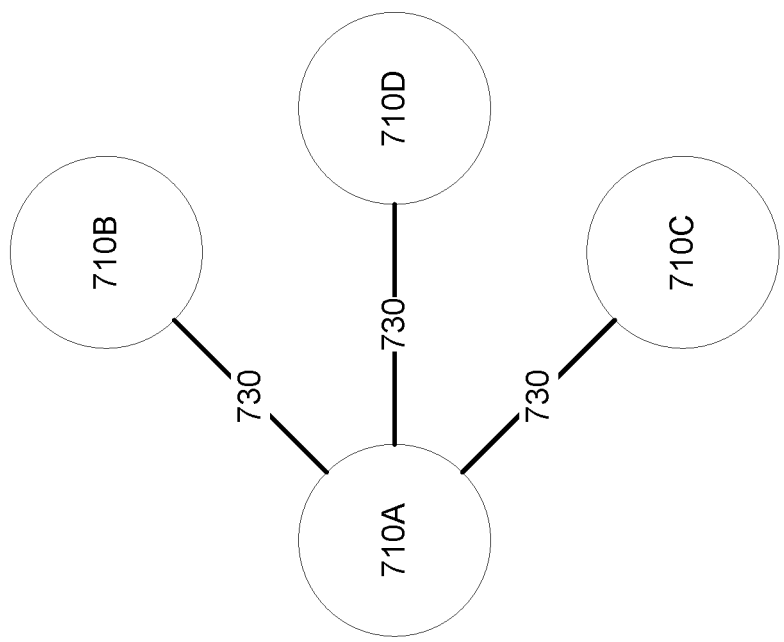

FIGS. 7A-7C illustrate another example of an update notification delay in existing implementations. As illustrated by FIG. 7A, when a device (e.g., device 710A) attempts to add a new data link 725 (e.g., device 710A has data links 720 with devices 710B and 710C and attempts to add device 710D) and further attempts, as illustrated by FIG. 7B, to update its availability schedule (e.g., proposed data links 730) to accommodate new data link 725, the device may not use its new updated schedule until after it notifies existing peers (e.g., devices 710B and 710C) about the new schedule. Once all peers have been updated, the device may begin usage of the new schedule as illustrated by FIG. 7C.

Figure 8:
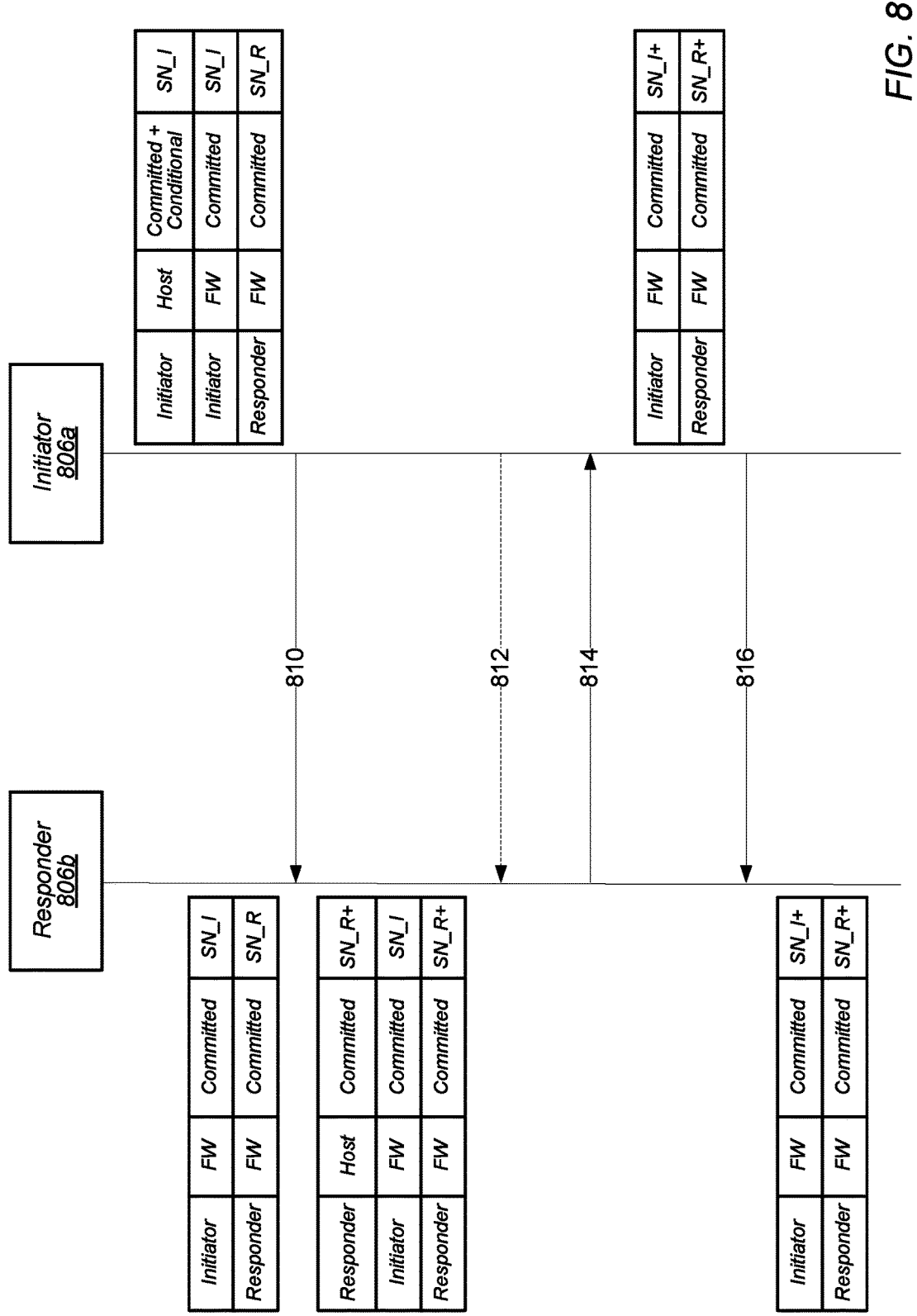
FIGS. 8-12 illustrate example techniques to propose and track a data link schedule update, according to some embodiments.

FIG. 8 illustrates an example technique to propose and track a data link schedule update, according to some embodiments. The technique (and/or signaling) shown in FIG. 8 may be used in conjunction with any of the systems or devices shown in the above Figures, among other devices. In various embodiments, some of the signaling shown may be performed concurrently, in a different order than shown, or may be omitted. Additional signaling may also be performed as desired. As shown, the signaling may operate as follows.

A first device (e.g., initiator 806a which may be a wireless station such as wireless station 106) may include a host module (Host) and a firmware module (FW) for scheduling a data link. In addition, a second device (e.g., responder 806b which may be a wireless station such as wireless station 106) may also include a host module and a firmware module for scheduling a data link. As shown, the devices may have agreed to an original communication schedule (e.g., a bitmap including a channel and frequency availability for the devices to communicate) for a data link and may maintain data structures in the host module and firmware modules for the data link schedule. In other words, the devices may maintain data structures with entries for a committed (e.g., agreed upon) schedule with a corresponding sequence number (e.g., SN_I and SN_R) in both the host module and the firmware module. In some embodiments, the data structures may include time bitmaps and corresponding channels corresponding to schedules for data links. The first device may generate an updated schedule proposal in the host module, with the existing committed schedule plus a new conditional schedule (which needs the confirmation from the peer device), while the firmware module maintains the existing committed schedule. However, since the schedule sequence number is associated with the committed schedule, the first device maintains the same sequence number at both the host module and the firmware module. The first device may transmit a data link schedule request 810 with the schedule update initial proposal generated by the host module to the second device (e.g., a message including time bitmaps and corresponding channels, as well as the sequence number associated with the committed schedule). Since the schedule update initial proposal from the first device includes both committed and conditional schedules, the first device may continue to communicate with the second device (e.g., at 812) according to the existing committed schedule until the first device receives an explicit acceptance or rejection of the schedule update initial proposal from the second device.

Upon receiving the schedule update initial proposal from the first device, the second device may decide to accept or, partially accept, or reject the proposal, and may then update its schedule data structures and sequence numbers at both the host and firmware modules (e.g., sequence number SN_R+ corresponds to its new committed schedule in both host and firmware data structures). Note that the second device still may maintain the first device's existing committed schedule and corresponding sequence number (e.g. SN_I) until the first device explicitly updates its committed schedule and corresponding sequence number. The second device may transmit a data link schedule response 814 confirming its acceptance or rejection of the schedule update initial proposal from the first device. The data link schedule response includes the second device's new committed schedule and corresponding sequence number (e.g. SN_R+). The first device may then update its committed schedule based on the response from the second device, and configure the firmware module with the updated committed schedules and corresponding sequence numbers (e.g. SN_I+ and SN_R+) for both itself and the second device. The first device may then transmit a data link schedule confirm message 816 to the second device with its new committed schedule and the corresponding sequence number (e.g. SN_I+). The second device may then update the firmware data structure with the updated committed schedule from the first device (e.g., sequence number SN_I+).

Figure 9:
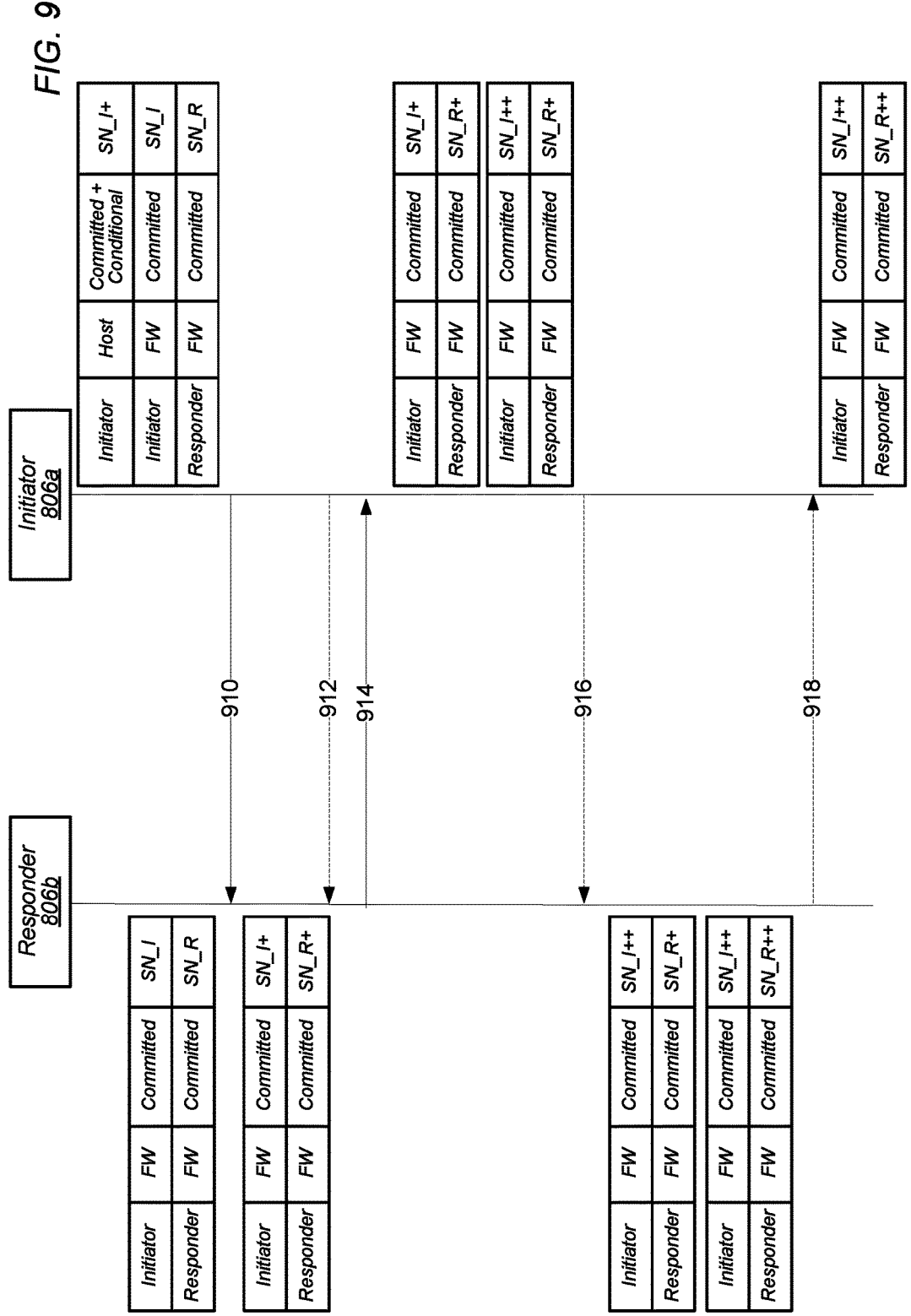

FIG. 9 illustrates another example technique to propose and track a data link schedule update, according to some embodiments. The technique (and/or signaling) shown in FIG. 9 may be used in conjunction with any of the systems or devices shown in the above Figures, among other devices. In various embodiments, some of the signaling shown may be performed concurrently, in a different order than shown, or may be omitted. Additional signaling may also be performed as desired. As shown, the signaling may operate as follows.

A first device (e.g., initiator 806a which may be a wireless station such as wireless station 106) may include a host module (Host) and a firmware module (FW) for scheduling a data link. In addition, a second device (e.g., responder 806b which may be a wireless station such as wireless station 106) may also include a host module and a firmware module for scheduling a data link. As shown, the devices may have agreed to an original communication schedule (e.g., a time and channel sequence for the devices to communicate) for a data link and may maintain data structures in the host module and firmware modules for the data link schedule. In other words, the devices may maintain data structures with entries for a committed (e.g., agreed upon) schedule with a corresponding sequence number (e.g., SN_I and SN_R). In some embodiments, the data structures may include bitmaps and corresponding channels associated with the schedules for data links. The first device may propose a schedule update and may update the host module data structure with the change, including a higher sequence number than that of its existing committed schedule programmed in its firmware module (e.g., sequence number SN_I+ corresponds to a committed plus conditional schedule in the host module but the sequence number SN_I corresponds to the committed schedule in the firmware module). The first device may transmit a data link schedule request 910 with a schedule update initial proposal which may include the proposed new committed plus conditional schedule and the corresponding sequence number (e.g. SN_I+), to the second device. The second device may accept the proposal from the first device and update data structures and sequence numbers at the firmware level (e.g., sequence number SN_R+ for its new committed schedule, and SN_I+ for the first device's new committed schedule based on the accepted proposal from the first device). Once the second device updates the committed schedule and the corresponding sequence number (e.g. SN_I+) for the first device, it may discard the schedule announcement from the first device with smaller sequence number (e.g. SN_I). Note that since the initial proposal from the first device includes a conditional schedule, the first device may continue to communicate (e.g., at 912) with the second device according to the existing committed schedule until the first device receives an explicit confirmation of the proposed new schedule from the second device.

The second device may transmit a data link schedule response 914 to accept the schedule update initial proposal from the first device. The response may include the second device's updated committed schedule and corresponding sequence number (e.g. SN_R+). The response may confirm usage of the first device's new committed schedule and the corresponding sequence number (e.g. SN_I+) based on the accepted proposal from the first device. Upon receiving the response from the second device, the first device may then update the firmware data structure with the updated schedules for both devices (e.g., sequence number SN_I+ and SN_R+ corresponding to committed schedules for the first and second devices, respectively). In other words, the conditional, or potential, sequence number becomes the committed, or real, sequence number if the proposed conditional schedule is accepted. In some embodiments, the first device may update the schedule a second time and additionally increment the sequence number in the firmware data structure (e.g., from SN_I+ to SN_I++). The first device may transmit the updated schedule to the second device at 916. The second device may increment sequence numbers in the firmware data structure (e.g., SN_I+ to SN_I++ and SN_R+ to SN_R++) upon receiving the update. The second device may then transmit a schedule update 918 to the first device and the first device may update the sequence number in the firmware data structure to correspond to the updated schedule (e.g., SN_R+ to SN_R++) from the second device.

Figure 10:
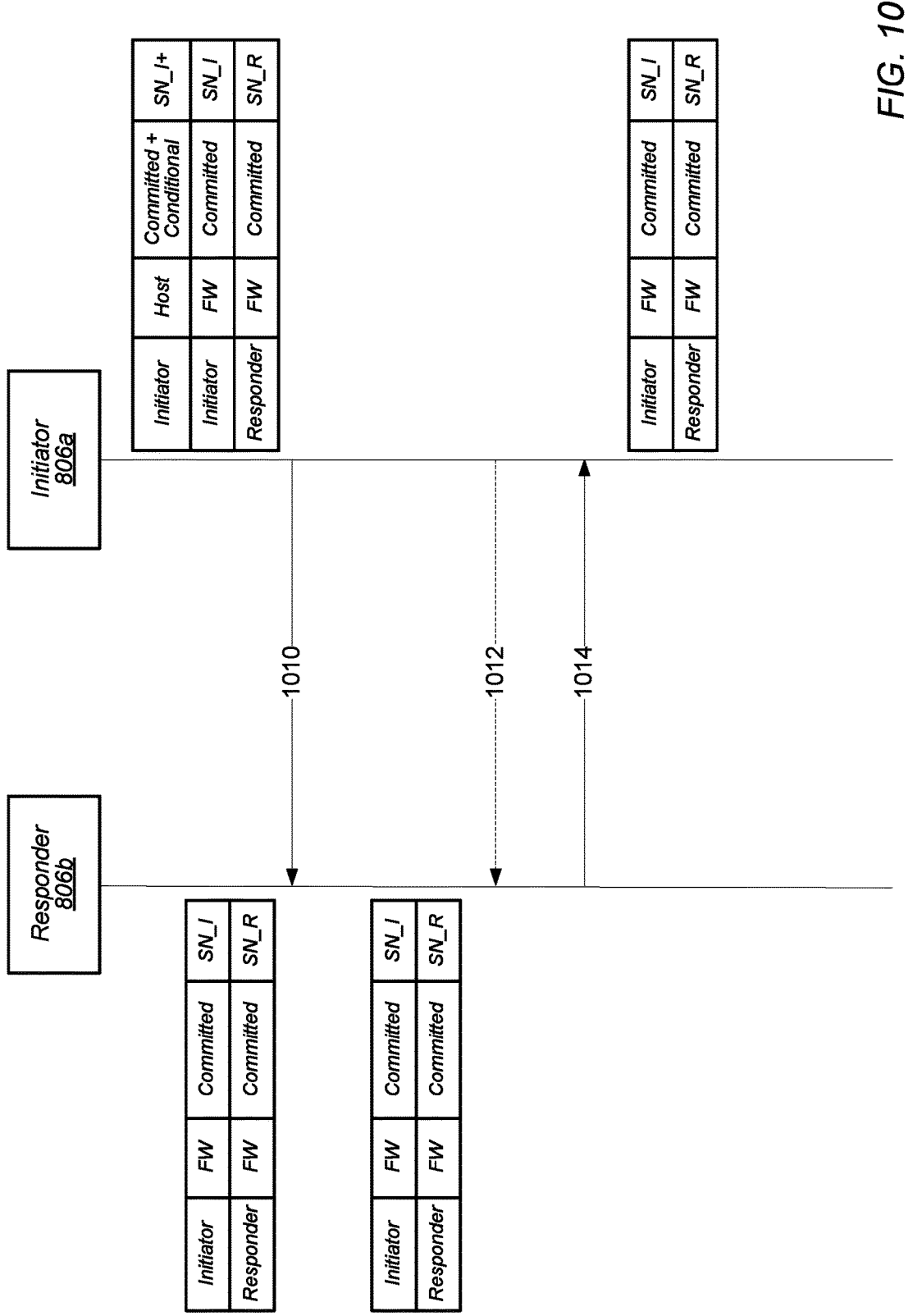

FIG. 10 illustrates yet another example technique to propose and track a data link schedule update, according to some embodiments. The technique (and/or signaling) shown in FIG. 10 may be used in conjunction with any of the systems or devices shown in the above Figures, among other devices. In various embodiments, some of the signaling shown may be performed concurrently, in a different order than shown, or may be omitted. Additional signaling may also be performed as desired. As shown, the signaling may operate as follows.

A first device (e.g., initiator 806*a* which may be a wireless station such as wireless station 106) may include a host module (Host) and a firmware module (FW) for scheduling a data link. In addition, a second device (e.g., responder 806*b* which may be a wireless station such as wireless station 106) may also include a host module and a firmware module for scheduling a data link. As shown, the devices may have agreed to an original communication schedule (e.g., a time and channel sequence for the devices to communicate) for a data link and may maintain data structures in the host module and firmware modules for the data link schedule. In other words, the devices may maintain data structures with entries for a committed (e.g., agreed upon) schedule with a corresponding sequence number (e.g., SN_I and SN_R). In some embodiments, the data structures may include bitmaps and corresponding channels associated with the schedules for data links. The first device may propose a schedule update and may update the host module data structure with the change, including a higher sequence number than that of its existing committed schedule programmed in its firmware module (e.g., sequence number SN_I+ corresponds to a committed plus conditional schedule in the host module but the sequence number SN_I corresponds to the committed schedule in the firmware module). The first device may transmit a data link schedule request 1010 with a schedule update initial proposal which may include the proposed new committed plus conditional schedule and the corresponding sequence number (e.g. SN_I+) to the second device. Note that since the initial proposal from the first device includes a conditional schedule, the first device may continue to communicate (e.g., at 1012) with the second device according to the existing committed schedule until the first device receives an explicit confirmation of the proposed new schedule from the second device. However, if the second device does not accept the schedule proposal (e.g., rejects the request), the second device may not update sequence numbers for both devices in the firmware data structure. Thus, the second device may transmit a data link schedule response rejecting the updated schedule 1014. Upon receiving the response, the first device may then maintain the firmware data structure with the original sequence numbers for both devices and not program the proposed schedule update to the firmware.

Figure 11:
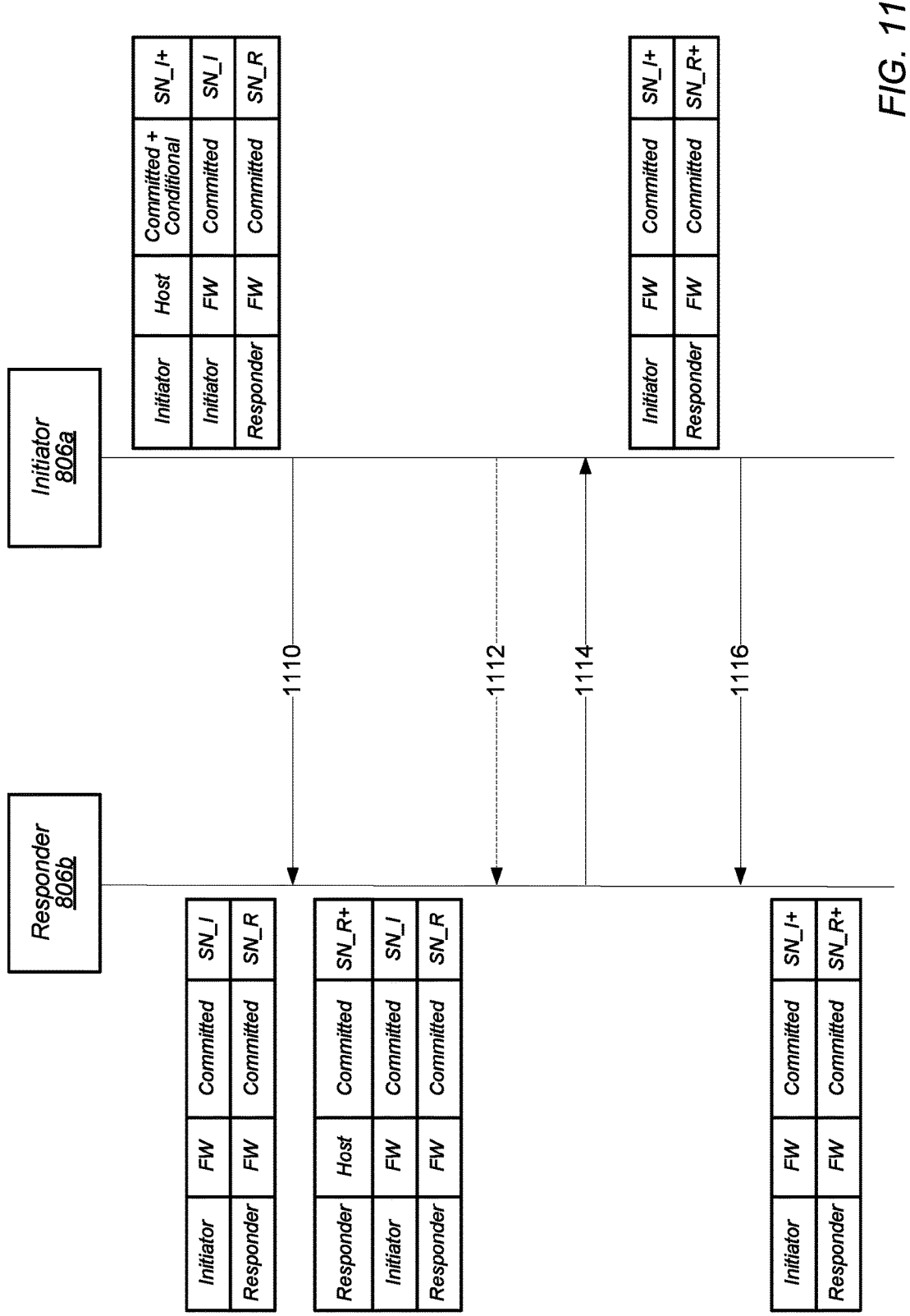

FIG. 11 illustrates another example technique to propose and track a data link schedule update, according to some embodiments. The technique (and/or signaling) shown in FIG. 11 may be used in conjunction with any of the systems or devices shown in the above Figures, among other devices. In various embodiments, some of the signaling shown may be performed concurrently, in a different order than shown, or may be omitted. Additional signaling may also be performed as desired. As shown, the signaling may operate as follows.

A first device (e.g., initiator 806*a* which may be a wireless station such as wireless station 106) may include a host module (Host) and a firmware module (FW) for scheduling a data link. In addition, a second device (e.g., responder 806*b* which may be a wireless station such as wireless station 106) may also include a host module and a firmware module for scheduling a data link. As shown, the devices may have agreed to an original communication schedule (e.g., a time and channel sequence for the devices to communicate) for a data link and may maintain data structures in the host module and firmware modules for the data link schedule. In other words, the devices may maintain data structures with entries for a committed (e.g., agreed upon) schedule with a corresponding sequence number (e.g., SN_I and SN_R). In some embodiments, the data structures may include bitmaps and corresponding channels associated with the schedules for data links. The first device may propose a schedule update and may update the host module data structure with the change, including a higher sequence number than that of its existing committed schedule programmed in its firmware module (e.g., sequence number SN_I+ corresponds to a committed plus conditional schedule in the host module but the sequence number SN_I corresponds to the committed schedule in the firmware module). The first device may transmit a data link schedule request 1110 with a schedule update initial proposal which may include the proposed new committed plus conditional schedule and the corresponding sequence number (e.g. SN_I+), to the second device. Note that since the initial proposal from the first device includes a conditional schedule, the first device may continue to communicate (e.g., at 1112) with the second device according to the existing committed schedule until the first device receives an explicit confirmation of the proposed new schedule from the second device. However, if the second device does not accept the schedule proposal and determines to counter the initial proposal from the first device, the second device may not update the first device's committed schedule and the corresponding sequence number in the firmware data structure. The second device may propose a countered schedule update with a committed and conditional schedule and may update the host module data structure with the countered proposal, including a higher sequence number than that of its existing committed schedule programmed in its firmware module (e.g., sequence number SN_R+ corresponds to a committed plus conditional schedule in the host module but the sequence number SN_R corresponds to the committed schedule in the firmware module). The second device may then transmit a data link schedule response 114 with the counter schedule proposal corresponding to an incremented sequence number (e.g., SN_R+). If the first device accepts the counter schedule proposal from the second device, it may then update the firmware data structure with the new committed schedules and corresponding sequence numbers (e.g., SN_I+ and SN_R+) for both devices. The first device then transmit a data link schedule confirm message 1116 to the second device with its updated committed schedule and corresponding sequence number (e.g. SN_I+). Upon receiving the data link schedule confirm message to accept the counter proposal, the second device may then update the firmware data structure with the new committed schedules and corresponding sequence numbers (SN_I+ and SN_R+) for both devices.

Figure 12:
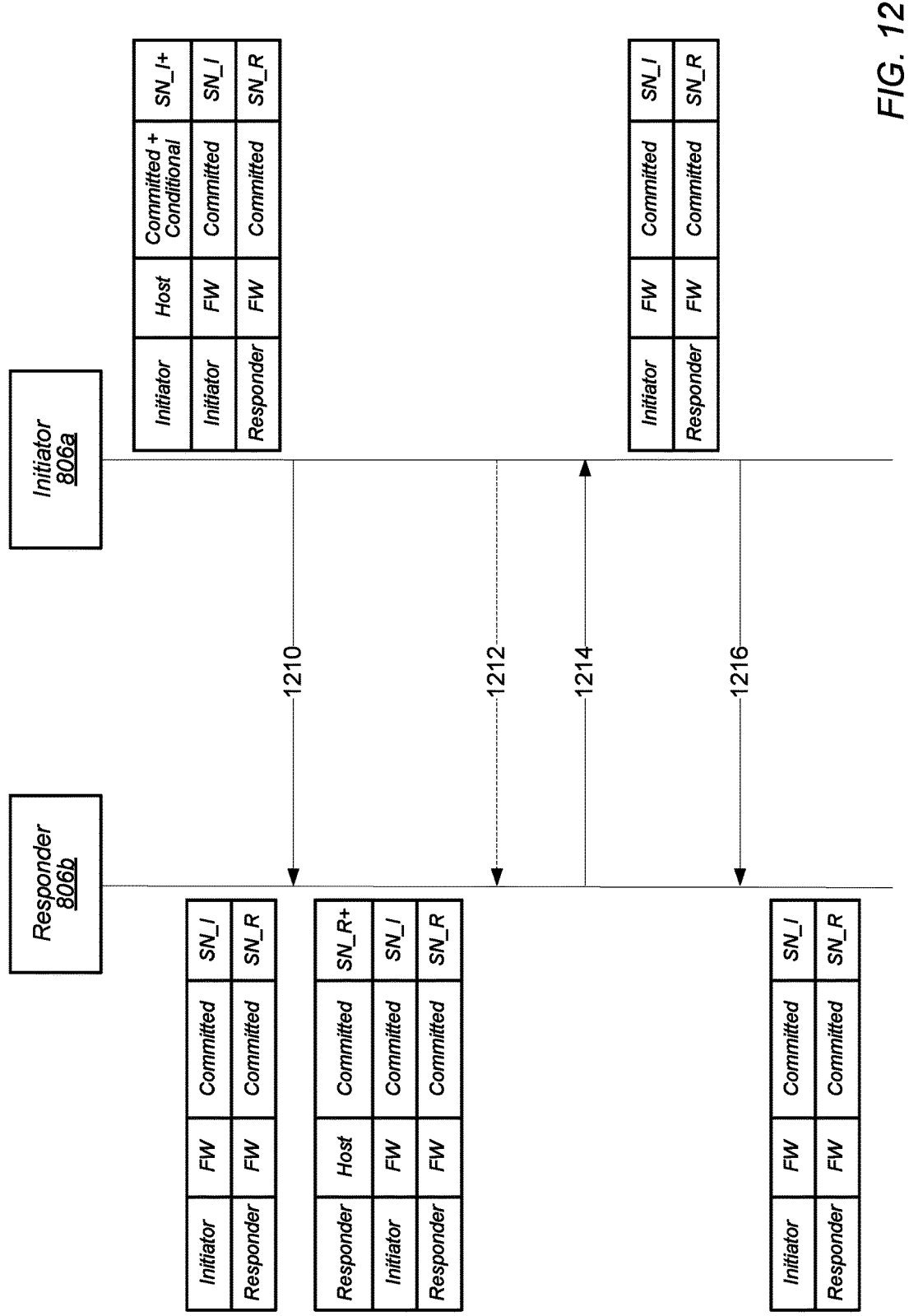

FIG. 12 illustrates another example technique to propose and track a data link schedule update, according to some embodiments. The technique (and/or signaling) shown in FIG. 12 may be used in conjunction with any of the systems or devices shown in the above Figures, among other devices. In various embodiments, some of the signaling shown may be performed concurrently, in a different order than shown, or may be omitted. Additional signaling may also be performed as desired. As shown, the signaling may operate as follows.

A first device (e.g., initiator 806a which may be a wireless station such as wireless station 106) may include a host module (Host) and a firmware module (FW) for scheduling a data link. In addition, a second device (e.g., responder 806b which may be a wireless station such as wireless station 106) may also include a host module and a firmware module for scheduling a data link. As shown, the devices may have agreed to an original communication schedule (e.g., a time and channel sequence for the devices to communicate) for a data link and may maintain data structures in the host module and firmware modules for the data link schedule. In other words, the devices may maintain data structures with entries for a committed (e.g., agreed upon) schedule with a corresponding sequence number (e.g., SN_I and SN_R). In some embodiments, the data structures may include bitmaps and corresponding channels associated with the schedules for data links. The first device may propose a schedule update and may update the host module data structure with the change, including a higher sequence number than that of its existing committed schedule programmed in its firmware module (e.g., sequence number SN_I+ corresponds to a committed plus conditional schedule in the host module but the sequence number SN_I corresponds to the committed schedule in the firmware module). The first device may transmit a data link schedule request 1210 with a schedule update initial proposal, which may include the proposed new committed plus conditional schedule and the corresponding sequence number (e.g. SN_I+), to the second device. Note that since the initial proposal from the first device includes a conditional schedule, the first device may continue to communicate (e.g., at 1212) with the second device according to the existing committed schedule until the first device receives an explicit confirmation of the proposed new schedule from the second device. However, if the second device does not accept the schedule proposal and determines to counter the initial proposal from the first device, the second device may not update the first device's committed schedule and the corresponding sequence number in the firmware data structure of the second device. The second device may propose a countered schedule update with a committed and conditional schedule, and may update the host module data structure with the countered proposal, including a higher sequence number than that of its existing committed schedule programmed in its firmware module (e.g., sequence number SN_R+ corresponds to a committed plus conditional schedule in the host module but the sequence number SN_R corresponds to the committed schedule in the firmware module). The second device may then transmit a data link schedule response 1214 with the counter schedule proposal corresponding to an incremented sequence number (e.g., SN_R+). However, the first device may reject the counter proposal from the second device and maintain the firmware data structure with the original committed schedules and corresponding sequence numbers for both devices and not program the updated schedule to the firmware. The first device may then transmit a data link schedule confirm 1216 to the second device to reject the counter proposal. Upon receiving the confirm, the second device may then maintain the firmware data structure with the original committed schedules and corresponding sequence numbers for both devices and not program the updated schedule to the firmware.

Figure 13:
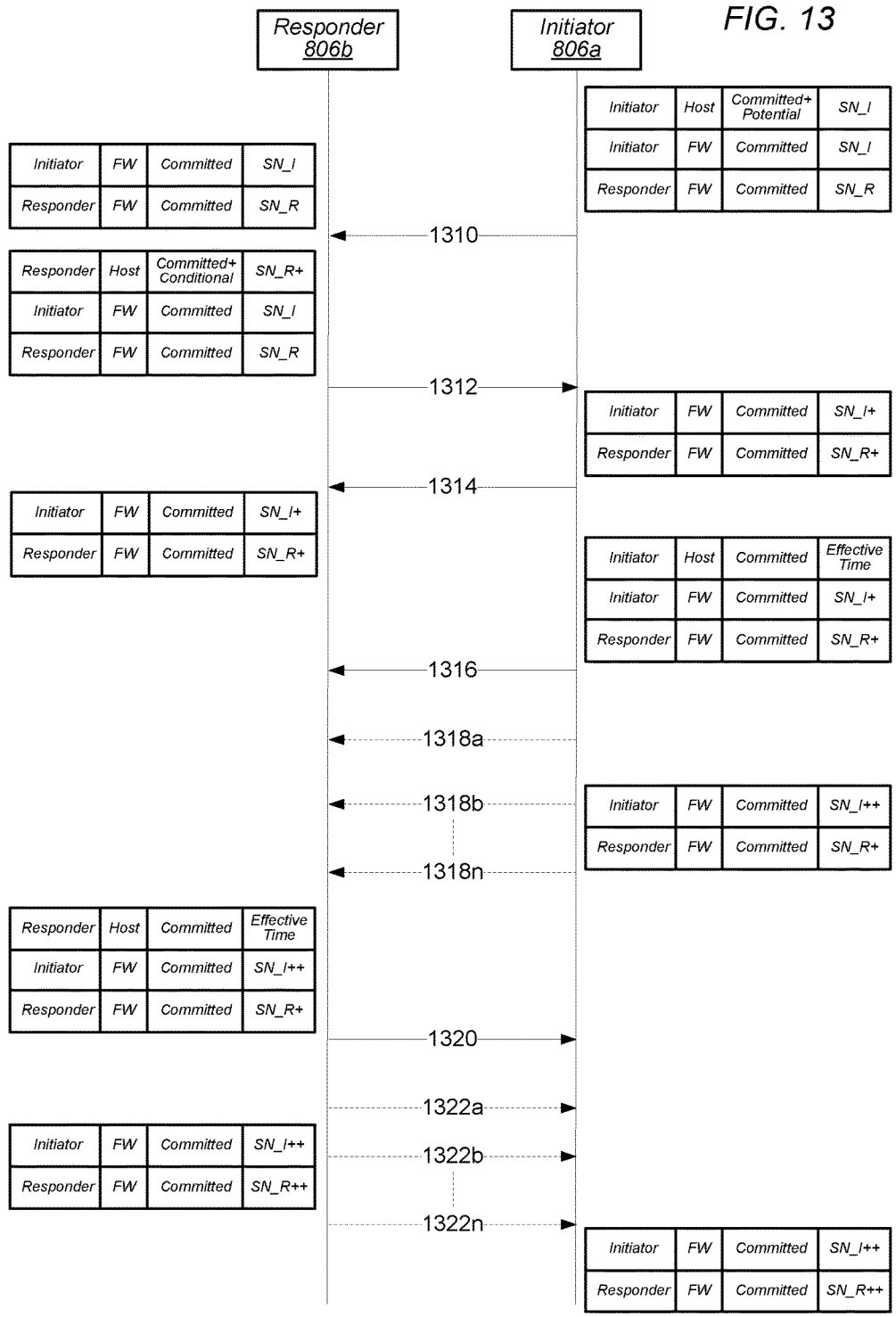
FIGS. 13-15 illustrate example techniques to propose and track a delayed data link schedule update, according to some embodiments.

FIG. 13 illustrates an example technique to propose and track a delayed data link schedule update, according to some embodiments. The technique (and/or signaling) shown in FIG. 13 may be used in conjunction with any of the systems or devices shown in the above Figures, among other devices. In various embodiments, some of the signaling shown may be performed concurrently, in a different order than shown, or may be omitted. Additional signaling may also be performed as desired. As shown, the signaling may operate as follows.

A first device (e.g., initiator 806a which may be a wireless station such as wireless station 106) may include a host module (Host) and a firmware module (FW) for scheduling a data link. In addition, a second device (e.g., responder 806b which may be a wireless station such as wireless station 106) may also include a host module and a firmware module for scheduling a data link. As shown, the devices may have agreed to an original communication schedule (e.g., a time and channel sequence for the devices to communicate) for a data link and may maintain data structures in the host module and firmware modules for the data link schedule. In other words, the devices may maintain data structures with entries for a committed (e.g., agreed upon) schedule with a corresponding sequence number (e.g., SN_I and SN_R). In some embodiments, the data structures may include bitmaps and corresponding channels associated with the schedules for data links. Note that when the first device has active data links with other peer devices, it may not change its existing schedules immediately without notifying its existing peer devices. Thus, in order to set up or update a data link schedule with the second device, the first device may update the host module data structure with a committed plus potential schedule. The potential schedule may be proposed without immediate commitment, even if the second device accepts the proposed potential schedule. The sequence number corresponding to the proposed committed plus potential schedule is the same as that of the committed schedule (e.g. SN_I). The first device may transmit a data link schedule request 1310 with a schedule update initial proposal to the second device and if the second device accepts the initial proposal, including the potential schedule, from the first device, the first device may update the data structures and sequence numbers at both the host and firmware levels with either a new committed schedule, or a new committed plus conditional schedule.

However, the second device may maintain the first device's existing committed schedule and corresponding sequence number. The second device may transmit a data link schedule response 1312 to the first device with the second device's new schedule and corresponding sequence number. Upon receiving the response, if the first device accepts the new schedule from the second device, the first device may keep its existing committed schedule (e.g. SN_I) or generate a temporary committed schedule (e.g. SN_I+) for the second device in order to start initial communication with the second device. The first device may transmit a schedule confirm to the second device at 1314. Note that the temporary schedule may not affect data link operations with other peer devices and the temporary schedule may not meet the quality of service (QoS) requirement for the data link between the first device and the second device. The first device may then generate a new committed schedule (e.g. SN_I++) that may better serve (e.g., support the QoS requirement) the data link to the second device. Note that prior to activating the new committed schedule, the first device may inform peer devices about the new schedule, its effective time, and the corresponding sequence number (e.g. SN_I++) at 1316. Note that until the effective time, the first device may continue to communicate (e.g., at 1318a-n) with the second device according to the temporary schedule. Once the new schedule is propagated to peer devices, the first device may activate its new committed schedule with the updated sequence number (e.g. SN_I++). The second device can further update its committed schedule (e.g. SN_R++) based on the first device's new committed schedule in order to improve the data link QoS support and update the first device at 1320. Note that until the effective time, the second device may continue to communicate with the first device according to the SN_R+ schedule at 1322a-n.

Figure 14:
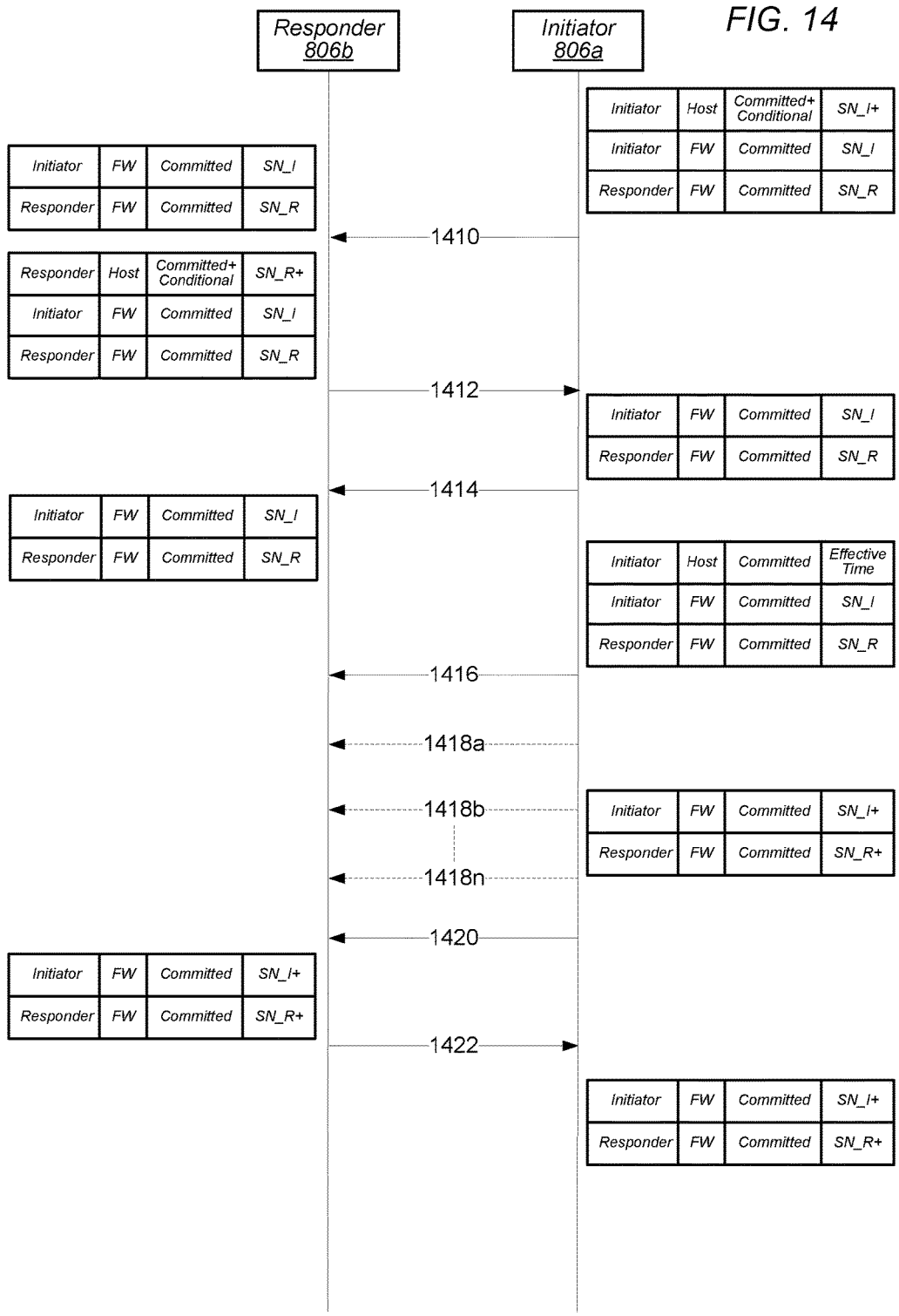

FIG. 14 illustrates another example technique to propose and track a delayed data link schedule update, according to some embodiments. The technique (and/or signaling) shown in FIG. 14 may be used in conjunction with any of the systems or devices shown in the above Figures, among other devices. In various embodiments, some of the signaling shown may be performed concurrently, in a different order than shown, or may be omitted. Additional signaling may also be performed as desired. As shown, the signaling may operate as follows.

A first device (e.g., initiator 806a which may be a wireless station such as wireless station 106) may include a host module (Host) and a firmware module (FW) for scheduling a data link. In addition, a second device (e.g., responder 806b which may be a wireless station such as wireless station 106) may also include a host module and a firmware module for scheduling a data link. As shown, the devices may have agreed to an original communication schedule (e.g., a time and channel sequence for the devices to communicate) for a data link and may maintain data structures in the host module and firmware modules for the data link schedule. In other words, the devices may maintain data structures with entries for a committed (e.g., agreed upon) schedule with a corresponding sequence number (e.g., SN_I and SN_R). In some embodiments, the data structures may include bitmaps and corresponding channels associated with the schedules for data links. When the first device has active data links with other peer devices, it cannot change its existing schedules immediately without notifying its existing peer devices first. In order to set up or update a data link schedule with the second device, the first device may update the host module data structure with a committed plus conditional schedule, which may not affect data link operations with other peer devices. The first device may transmit a data link schedule request 1410 with a schedule update initial proposal to the second device. If the second device cannot accept the initial proposal, the second device may send back a data link schedule response 1412 with a countered proposal. If the first device determines to accept the countered proposal, but needs to change its existing committed schedule significantly, the first device may first reject the counter proposal from the second device with a reason code "to be renegotiated" at 1414. The first device may then generate a new committed schedule that can better serve the data link to the second device. However, prior to activating the new committed schedule, the first device may inform peer devices about the new schedule, its effective time, and the corresponding sequence number at 1416. Note that until the effective time, the first device may continue to communicate (e.g., at 1418a-n) with the second device according to the temporary schedule. Once the new schedule is propagated to peer devices, the first device may activate its new committed schedule with the updated sequence number. Then the first device may start a new negotiation with the second device by using its new committed schedule by transmitting a data link schedule request 1420. The second device may send back a data link schedule response 1422 accepting the proposal.

Figure 15:
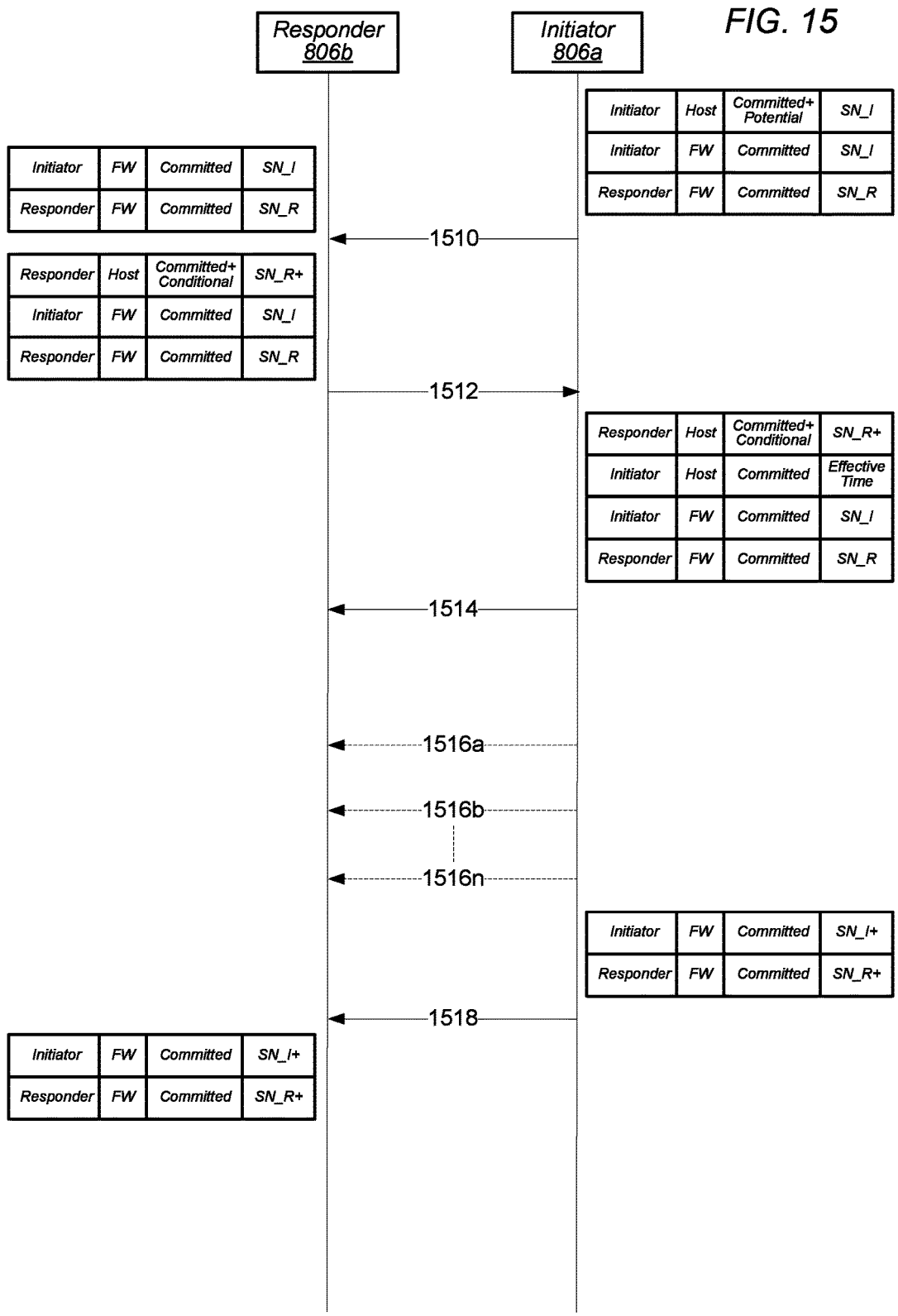

FIG. 15 illustrates another example technique to propose and track a delayed data link schedule update, according to some embodiments. The technique (and/or signaling) shown in FIG. 15 may be used in conjunction with any of the systems or devices shown in the above Figures, among other devices. In various embodiments, some of the signaling shown may be performed concurrently, in a different order than shown, or may be omitted. Additional signaling may also be performed as desired. As shown, the signaling may operate as follows.

A first device (e.g., initiator 806a which may be a wireless station such as wireless station 106) may include a host module (Host) and a firmware module (FW) for scheduling a data link. In addition, a second device (e.g., responder 806b which may be a wireless station such as wireless station 106) may also include a host module and a firmware module for scheduling a data link. As shown, the devices may have agreed to an original communication schedule (e.g., a time and channel sequence for the devices to communicate) for a data link and may maintain data structures in the host module and firmware modules for the data link schedule. In other words, the devices may maintain data structures with entries for a committed (e.g., agreed upon) schedule with a corresponding sequence number (e.g., SN_I and SN_R). In some embodiments, the data structures may include bitmaps and corresponding channels associated with the schedules for data links. Note that when the first device has active data links with other peer devices, the first device may not change its existing schedules immediately without notifying its existing peer devices. Thus, in order to set up or update a data link schedule with the second device, the first device may update the host module data structure with a committed plus conditional schedule which may not affect data link operations with other peer devices. The first device may transmit a data link schedule request 1510 with a schedule update initial proposal to the second device. If the second device cannot accept the initial proposal, the second device may transmit a data link schedule response 1512 with a counter proposal to the first device. If the first device wants to accept the counter proposal, but needs to change its existing committed schedule significantly, the first device may defer sending back the data link confirm to the second device. The first device may then generate a new committed schedule that may better serve the data link to the second device. However, prior to activating the new committed schedule, the first device may inform peer devices about the new schedule, its effective time, and the corresponding sequence number at 1514. Note that until the effective time, the first device may continue to communicate (e.g., at 1516*a*-*n*) with the second device according to the temporary schedule. Once the new schedule is propagated to peer devices, the first device may activate its new committed schedule with the updated sequence number. Then the first device may transmit the data link confirm 1518 to the second device to accept the countered proposal and update its new committed schedule. The second device may also defer the data link response transmission to the first device if it needs to update its new schedule (in its counter proposal) with other peer devices first. Note that the devices may enable longer time-out values for the schedule negotiation in order to accommodate the deferred response or confirm messages.

Figure 16:
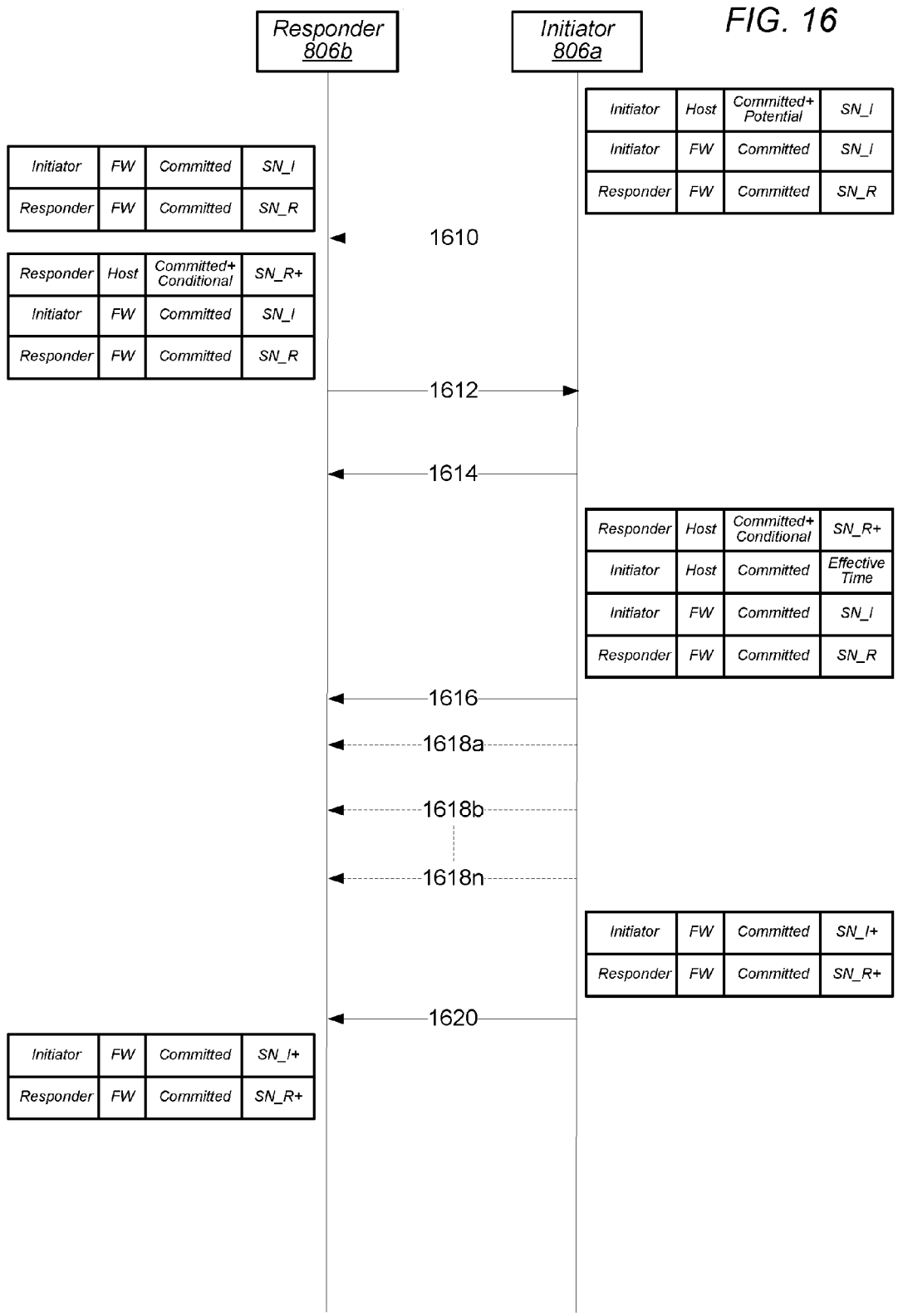
FIG. 16 illustrates an example of a device deferring its data link response or confirm to a peer device in order to update its other peers with a new committed schedule, according to some embodiments.

FIG. 16 illustrates examples of a device deferring its data link response or confirm to a peer device in order to update its other peers with a new committed schedule, according to some embodiments. The technique (and/or signaling) shown in FIG. 15 may be used in conjunction with any of the systems or devices shown in the above Figures, among other devices. In various embodiments, some of the signaling shown may be performed concurrently, in a different order than shown, or may be omitted. Additional signaling may also be performed as desired. As shown, the signaling may operate as follows.

A first device (e.g., initiator 806*a* which may be a wireless station such as wireless station 106) may include a host module (Host) and a firmware module (FW) for scheduling a data link. In addition, a second device (e.g., responder 806*b* which may be a wireless station such as wireless station 106) may also include a host module and a firmware module for scheduling a data link. As shown, the devices may have agreed to an original communication schedule (e.g., a time and channel sequence for the devices to communicate) for a data link and may maintain data structures in the host module and firmware modules for the data link schedule. In other words, the devices may maintain data structures with entries for a committed (e.g., agreed upon) schedule with a corresponding sequence number (e.g., SN_I and SN_R). In some embodiments, the data structures may include bitmaps and corresponding channels associated with the schedules for data links. Note that when the first device has active data links with other peer devices, the first device may not change its existing schedules immediately without notifying its existing peer devices. Thus, in order to set up or update a data link schedule with the second device, the first device may update the host module data structure with a committed plus conditional schedule which may not affect data link operations with other peer devices. The first device may transmit a data link schedule request 1610 with a schedule update initial proposal to the second device. If the second device cannot accept the initial proposal, the second device may transmit a data link schedule response 1612 with a counter proposal to the first device, including an indication that the schedule response may be deferred (or delayed). The device may transmit a response or confirm deferred message 1614 to the peer so that the peer device may enable a longer timeout to wait for the deferred response or confirm. The first device may then generate a new committed schedule that may better serve the data link to the second device. However, prior to activating the new committed schedule, the first device may inform peer devices about the new schedule, its effective time, and the corresponding sequence number at 1616. Note that until the effective time, the first device may continue to communicate (e.g., at 1618*a*-*n*) with the second device according to the temporary schedule. Once the new schedule is propagated to peer devices, the first device may activate its new committed schedule with the updated sequence number. Then the first device may transmit the data link confirm 1620 to the second device to accept the countered proposal and update its new committed schedule. The second device may also defer the data link response transmission to the first device if it needs to update its new schedule (in its counter proposal) with other peer devices first. Note that the devices may enable longer time-out values for the schedule negotiation in order to accommodate the deferred response or confirm messages.

Figure 17A:
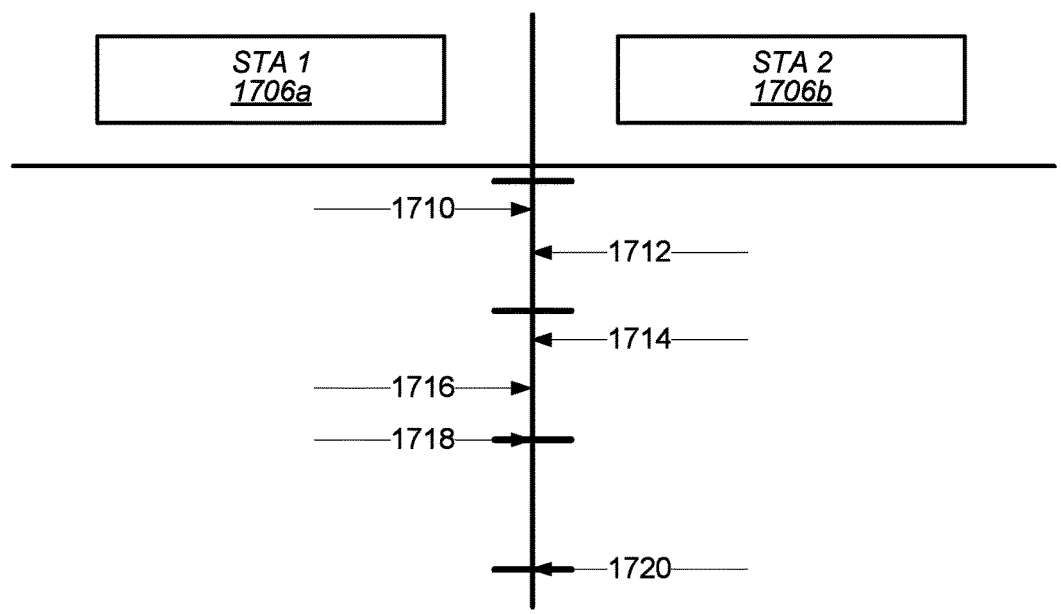
FIGS. 17A-B illustrate examples of committed schedule updates via unicast messaging, according to some embodiments.
Figure 17B:
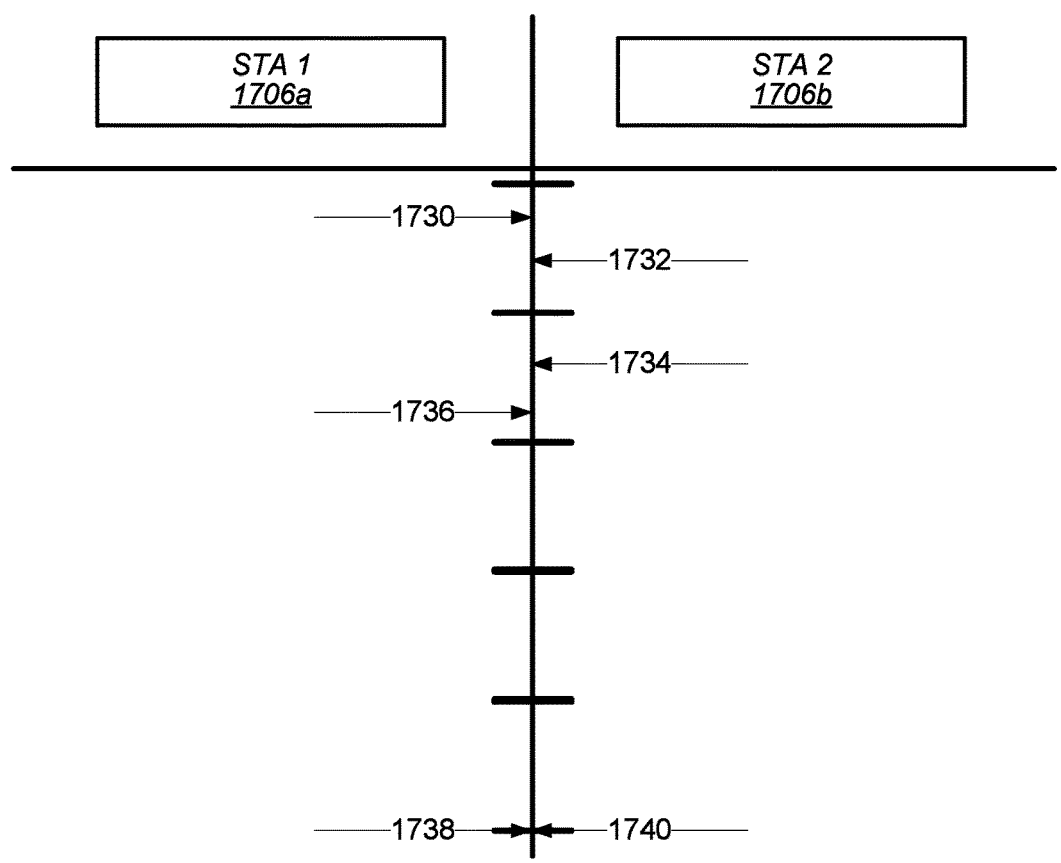

FIGS. 17A-B illustrate examples of committed schedule updates via unicast messaging, according to some embodiments. In some embodiments, as illustrated by FIG. 17A, the update may be approximately immediate, e.g., in a first or second slot boundary after the schedule update has been acknowledged by a peer device involved in the unicast communication. For example, at 1710, a wireless station 1706*a* (which may be a client station 106) may update and announce a new schedule to a peer device such as wireless station 1706*b* (which may be a client station 106), and wireless station 1706*b* may acknowledge the schedule update at 1712. Wireless station 1706*b* may also update its schedule accordingly and announce a new schedule to wireless station 1706*a* at 1714, and wireless station 1706*a* may acknowledge the schedule update at 1716. Then, at 1718, at a second slot boundary after wireless station 1706*a* announced the schedule update, wireless station 1706*a* may switch to its new schedule; and at 1720, at a second slot boundary after the wireless station 1706*b* announces the schedule update, wireless station 1706*b* may switch to its new schedule.

In some embodiments, as illustrated by FIG. 17B, the update may be delayed, e.g., until a next CRB or second next CRB. In some embodiments, the update may be associated with a countdown, e.g., a number of slots, a number of CRBs, a number of CRB periods, and/or a number of discovery window (DW) intervals. Note that the countdown value may be included in the schedule update. In some embodiments, the update may occur at a specified future time. Note that the specified future time (e.g., effective time) may be included or specified in the schedule update. For example, at 1730, wireless station 1706*a* may update and announce a new schedule and wireless station 1706*b* may acknowledge the schedule update at 1732. Wireless station 1706*b* may update its own schedule at 1734 and wireless station 1706*a* may acknowledge the schedule update at 1736. Then, after a specified delay, the wireless stations 1706*a*-*b* may both switch to their new schedules at 1738 and 1740.

Figure 18A:
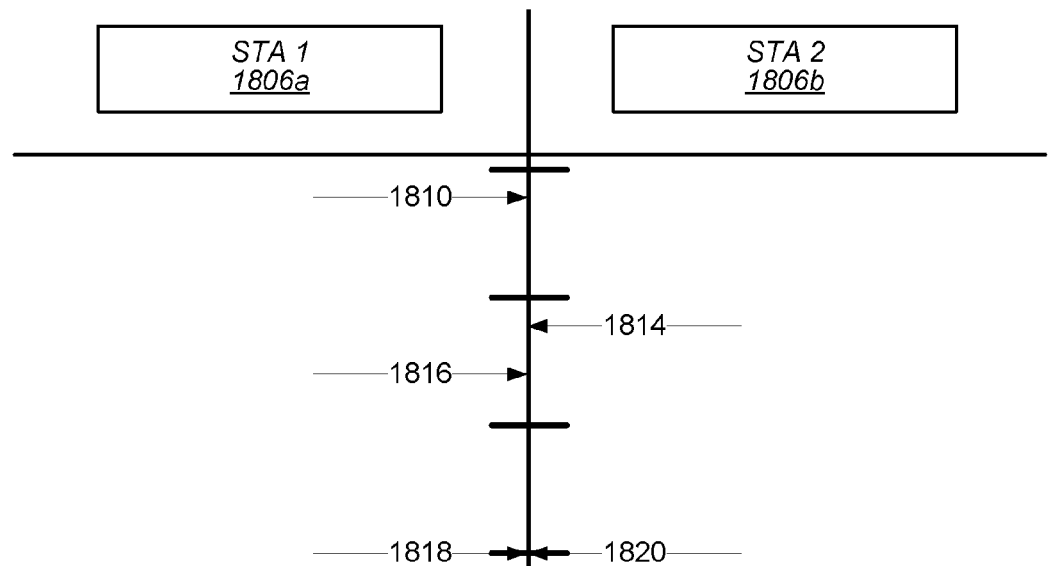
FIGS. 18A-B illustrate examples of conditional schedule updates via unicast messaging, according to some embodiments.
Figure 18B:
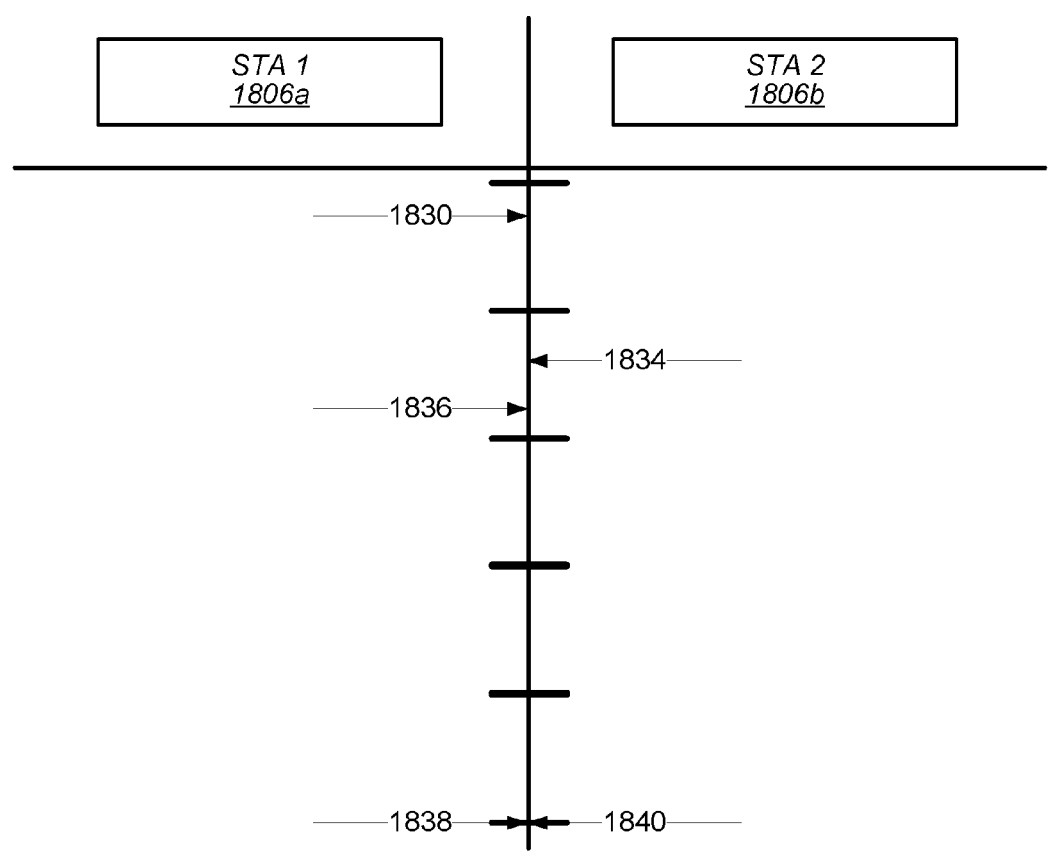

FIGS. 18A-B illustrate examples of conditional schedule updates via unicast messaging, according to some embodiments. In some embodiments, as illustrated by FIG. 18A, the update may be approximately immediate, e.g., in a first or second slot boundary after the schedule update has been accepted by a peer device involved in the unicast communication. For example, at 1810, a wireless station 1806*a* (which may be a client station 106) may update and announce a new conditional schedule and a peer device, such as wireless station 1806*b* (which may be a client station 106) may accept the conditional schedule update at 1814. Wireless station 1806*a* may acknowledge wireless station 1806*b*'s acceptance of the conditional schedule at 1816. Then, in a second slot boundary after the wireless station 1806*b* accepted the conditional schedule update, the wireless stations 1806*a-b* may both switch to the new schedule at 1818 and 1820.

In some embodiments, as illustrate by FIG. 18B, the update may be delayed, e.g., until a next CRB or second next CRB. In some embodiments, the update may be associated with a countdown, e.g., a number of slots, a number of CRBs, a number of CRB periods, and/or a number of discovery window (DW) intervals. Note that the countdown value may be included in the schedule update. In some embodiments, the update may occur at a specified future time. Note that the specified future time (e.g., effective time) may be included or specified in the schedule update. For example, at 1830, wireless station 1806*a* may update and announce a new conditional schedule and wireless station 1806*b* may accept the conditional schedule update at 1834 and wireless station 1806*a* may acknowledge wireless station 1806*b*'s acceptance of the conditional schedule at 1836. Then, after a specified delay, the wireless stations 1806*a-b* may both switch to the new schedule at 1838 and 1840.

Figure 19:
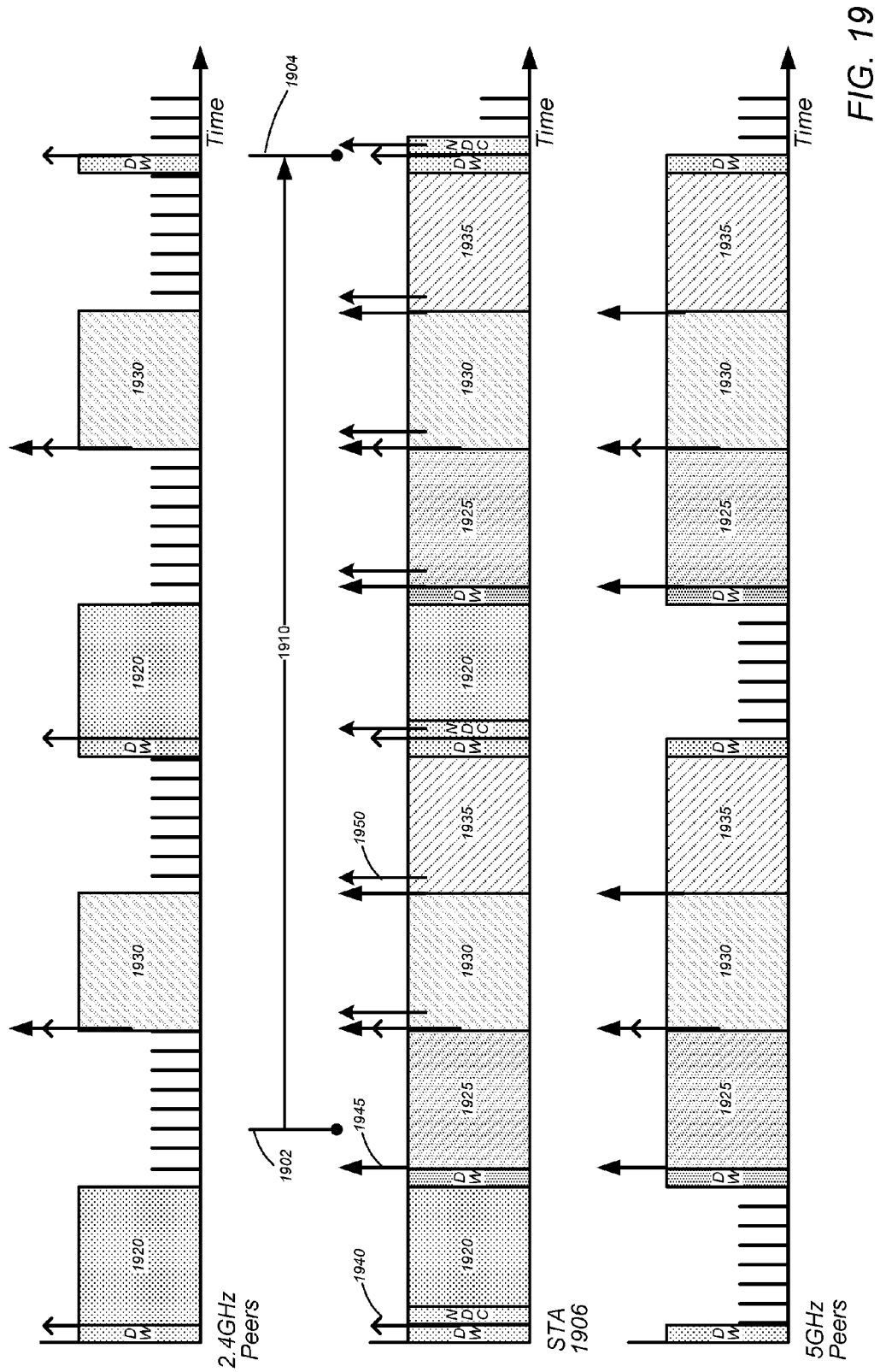
FIG. 19 illustrates an example of a committed schedule update via broadcast messaging, according to some embodiments.

FIG. 19 illustrates an example of a committed schedule update via broadcast messaging, according to some embodiments. In some embodiments, when a device, such as station 1906 (which may be a client station 106) uses broadcast frames to update its schedule to active peers (e.g., 2.4 GHz and 5 GHz peers), the device may transmit at least one broadcast schedule update frame at rendezvous points (RPs) negotiated with peers (e.g., beacons 1945), at a beginning of CRBs negotiated with peers (e.g., beacons 1940), and/or a beginning of NAN Data Cluster CRBs (e.g., beacons 1950). Thus, broadcast schedule update frames may be broadcast during 2.4 GHz discovery windows 1920, 5 GHz discovery windows 1925, and/or data transmission windows 1930 and/or 1935, as well as data cluster windows (NDCs). Note that in some embodiments, the device may continue to transmit the broadcast schedule update frame before the new schedule effective time (e.g., the device may begin to broadcast the schedule update at 1902 for a duration 1910 prior to the new schedule effective time at 1904). In some embodiments, the device may continue transmitting the broadcast schedule update frame for certain DW intervals after the new schedule effective time.

Figure 20:
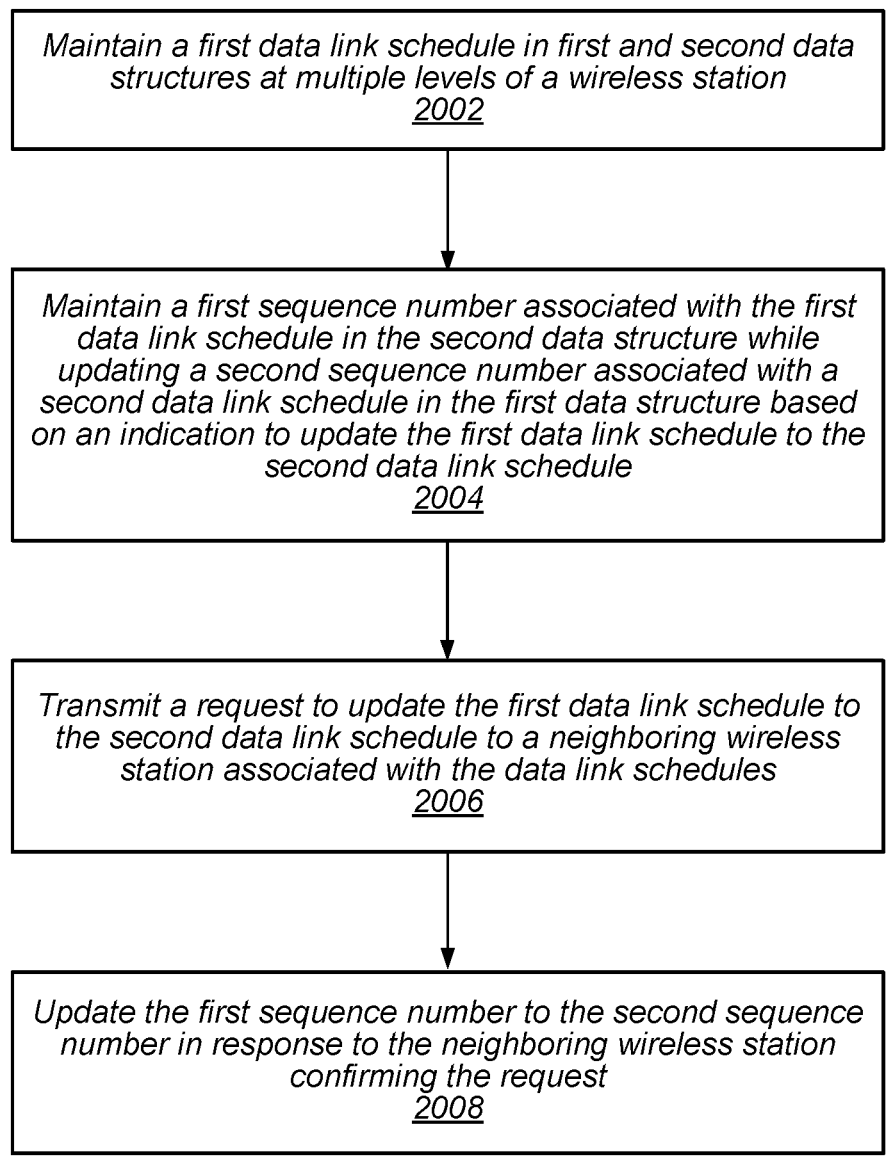
FIG. 20 illustrates a block diagram of an example of a method for a device to update peer devices of an updated data communication schedule, according to some embodiments.

FIG. 20 illustrates a block diagram of an example of a method for a device to update peer devices of an updated data communication schedule, according to some embodiments. The method shown in FIG. 20 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 2002, a first data communication (e.g., data link) schedule associated with a neighboring wireless station may be maintained at multiple levels (or layers) of a wireless station, such as wireless station 106. In some embodiments, a first data structure may be maintained (or stored/updated) at a first level (or layer) and a second data structure may be maintained (or stored/updated) at a second level or layer. In some embodiments, the first level (or layer) may be (or include) a host (or application) module and the second level (or layer) may be (or include) a firmware module (FW). In some embodiments, the data communication schedule may include times and/or channels for communicating with the neighboring wireless station. In some embodiments, the data structures may include bitmaps representing times and/or corresponding channels associated with the data communication schedule. In some embodiments, the first data communication schedule may be associated with (or correspond to) a first sequence number and the first sequence number may be maintained in both data structures. In some embodiments, the data communication schedule may be considered a committed (e.g., agreed upon) schedule.

At 2004, a sequence number (e.g., a second sequence number) associated with a second data communication schedule may be updated (e.g., incremented) in the first data structure while the sequence number (e.g., the first sequence number) associated with the first data communication schedule may be maintained (e.g., unchanged) in the second data structure. The update of the sequence number associated with the second data communication schedule may be based, at least in part, on an indication to update the first data communication schedule to the second data communication schedule. In some embodiments, the second data communication schedule may be considered a conditional (e.g., proposed) schedule that may require confirmation (e.g., acceptance) from the neighboring wireless station prior to adoption (or implementation) of the second data communication schedule.

At 2006, a request to update the first data communication schedule may be transmitted to the neighboring wireless station. The update may be transmitted according to (or via) a (wireless) peer-to-peer communication protocol such as NAN or Wi-Fi Direct, among other peer-to-peer communication protocols. In some embodiments, the request to update the first data communication schedule to the second data communication schedule may include an indication of an effective start time of the second data communication schedule. In some embodiments, the effective start time of the second data link schedule may be specified as one of a number of slots (or frames/sub-frames) until the effective start time, a number (or set) of channel resource blocks (CRBs) until the effective start time, a number CRB periods until the effective start time, and/or a number of discovery window intervals until the effective start time. In some embodiments, the request may include the second data communication schedule and the second sequence number. In some embodiments, the second data communication schedule may include a committed portion and a conditional portion. In some embodiments, the committed portion may be a subset of the first data communication schedule.

At 2008, the first sequence number in the second data structure may be updated to correspond to the second sequence number in second data structure and the second data structure may be updated to include the second data communication schedule. In some embodiments, the update may be based (at least in part) on a confirmation (and/or counter schedule proposal) of the second data communication schedule received from the neighboring wireless station. In other words, the update may be in response to receiving a confirmation of the second data communication schedule from the neighboring wireless station. Note that the confirmation may indicate that the neighboring wireless station has accepted the second data communication schedule and intends to follow the second data communication schedule.

In some embodiments, a third sequence number may be maintained in the second data structure. The third sequence number may be associated with a third data communication schedule received from the neighboring wireless station. In some embodiments, the third data communication schedule may be a counter proposal to the second data communication schedule.

In some embodiments, subsequent to updating the second data structure, a confirmation message may be transmitted to the neighboring wireless station. The confirmation message may include the second data communication and corresponding second sequence number. In some embodiments, peer-to-peer communications according to the first data communication schedule may be maintained (e.g., may be on-going concurrently with a negotiation to change from the first data communication schedule to the second data communication schedule) until the wireless station confirms the second data communication schedule (e.g., transmits the confirmation message to the neighboring wireless station).

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless station, comprising:
   at least one antenna;
   at least one radio in communication with the at least one antenna and configured to perform short range communications via a Wi-Fi interface; and
   at least one processor in communication with the at least one radio;
   wherein the at least one processor is configured to cause the wireless station to:
      maintain a first data link schedule with a neighboring wireless station at a first and second level of the wireless station, wherein to maintain the data link schedule the wireless station is configured to maintain a first data structure on the first level and maintain a second data structure on the second level, wherein the first data link schedule is associated with a first sequence number;
      in response to an indication to update the first data link schedule to a second data link schedule, update a second sequence number associated with the second data link schedule in the first data structure while maintaining the first sequence number associated with the first data link schedule in the second data structure;
      transmit to the neighboring wireless station, via a peer-to-peer communication protocol, a request to update the first data link schedule to the second data link schedule; and
      in response to receiving a confirmation of the second data link schedule from the neighboring wireless station, update the second data structure with the second data link schedule and the second sequence number.

2. The wireless station of claim 1,
   wherein the at least one processor is further configured to cause the wireless station to:
      maintain a third sequence number in the second data structure, wherein the third sequence number is associated with a third data link schedule received from the neighboring wireless station.

3. The wireless station of claim 1,
   wherein the request to update the first data link schedule to the second data link schedule includes an indication of an effective start time of the second data link schedule.

4. The wireless station of claim 3,
   wherein the effective start time of the second data link schedule is specified as one of:
      a number of slots until the effective start time;
      a number of channel resource blocks (CRBs) until the effective start time;
      a number CRB periods until the effective start time; or
      a number of discovery window intervals until the effective start time.

5. The wireless station of claim 1,
   wherein the second data link schedule includes a committed portion and a conditional portion.

6. The wireless station of claim 5,
   wherein the committed portion comprises a subset of the first data link schedule.

7. The wireless station of claim 1,
   wherein the at least one processor is further configured to cause the wireless station to:
      subsequent to transmitting the request, perform peer-to-peer communications with the neighboring wireless station according to the first data link schedule; and
      subsequent to receiving the confirmation, perform peer-to-peer communications with the neighboring wireless station according to the second data link schedule.

8. The wireless station of claim 1,
wherein a data link schedule specifies times and channels for peer-to-peer communications.

9. The wireless station of claim 8,
wherein a data structure includes a bitmap representing the data link schedule.

10. An apparatus, comprising:
a memory; and
at least one processor in communication with the memory, wherein the at least one processor is configured to:
    communicate, according to a peer-to-peer communication protocol, with a neighboring wireless device using a first data link schedule, wherein the first data link schedule is substantially concurrently maintained at an application layer and a firmware layer of a wireless device, wherein the first data link schedule is associated with a first sequence number;
    receive, at the application layer, an indication to update the first data link schedule to a second data link schedule, wherein the second data link schedule is associated with a second sequence number, and wherein the second data link schedule includes a committed portion and a conditional portion;
    generate instructions to transmit, to the neighboring wireless device, a request to update the first data link schedule to the second data link schedule, and wherein the second data link schedule is maintained at the application layer; and
    in response to receiving a confirmation of the second data link schedule from the neighboring wireless device, update the firmware layer with the second data link schedule and the second sequence number.

11. The apparatus of claim 10,
wherein the first and second data link schedules are specified by respective bitmaps, wherein the bitmaps represent times and channels for peer-to-peer communication.

12. The apparatus of claim 10,
wherein the request to update the first data link schedule to the second data link schedule includes an indication of an effective start time of the second data link schedule.

13. The apparatus of claim 12,
wherein the effective start time of the second data link schedule is specified as one of:
    a number of slots until the effective start time;
    a number of channel resource blocks (CRBs) until the effective start time;
    a number CRB periods until the effective start time; or
    a number of discovery window intervals until the effective start time.

14. The apparatus of claim 10,
wherein the committed portion of the second data link schedule comprises a subset of the first data link schedule.

15. The apparatus of claim 10,
wherein peer-to-peer communication protocol comprises a Neighbor Awareness Networking (NAN) protocol.

16. A non-transitory computer readable memory medium storing program instructions executable by processing circuitry of a wireless station to perform operations comprising:
    communicating, according to a peer-to-peer communication protocol, with a neighboring wireless station using a first data communication schedule, wherein the first data communication schedule is maintained at an application layer and a firmware layer of the wireless station, wherein the first data communication schedule is associated with a first sequence number;
    receiving, at the application layer, an indication to update the first data communication schedule to a second data communication schedule, wherein the second data link schedule is associated with a second sequence number;
    generating instructions to transmit, to the neighboring wireless station, a request to update the first data communication schedule to the second data communication schedule, wherein the second data link schedule is maintained at the application layer, and wherein the request includes an effective time of the second data communication schedule; and
    in response to receiving a confirmation of the second data link schedule from the neighboring wireless device, updating the firmware layer with the second data link schedule and the second sequence number.

17. The non-transitory memory medium of claim 16,
wherein the first and second data link schedules are specified by respective bitmaps, wherein the bitmaps represent times and channels for peer-to-peer communication.

18. The non-transitory memory medium of claim 16,
wherein the second data link schedule includes a committed portion and a conditional portion.

19. The non-transitory memory medium of claim 18,
wherein the committed portion of the second data link schedule comprises a subset of the first data link schedule.

20. The non-transitory memory medium of claim 16,
wherein the effective start time of the second data link schedule is specified as one of:
    a number of slots until the effective start time;
    a number of channel resource blocks (CRBs) until the effective start time;
    a number CRB periods until the effective start time; or
    a number of discovery window intervals until the effective start time.

* * * * *